(12) United States Patent
Iwai et al.

(10) Patent No.: US 12,557,042 B2
(45) Date of Patent: Feb. 17, 2026

(54) TERMINAL AND COMMUNICATION METHOD

(71) Applicant: Panasonic Intellectual Property Corporation of America, Torrance, CA (US)

(72) Inventors: Takashi Iwai, Ishikawa (JP); Hidetoshi Suzuki, Kanagawa (JP); Ayako Horiuchi, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 360 days.

(21) Appl. No.: 18/246,013

(22) PCT Filed: Jun. 22, 2021

(86) PCT No.: PCT/JP2021/023674
§ 371 (c)(1),
(2) Date: Mar. 20, 2023

(87) PCT Pub. No.: WO2022/064795
PCT Pub. Date: Mar. 31, 2022

(65) Prior Publication Data
US 2023/0362840 A1    Nov. 9, 2023

(30) Foreign Application Priority Data
Sep. 24, 2020 (JP) ................ 2020-159879

(51) Int. Cl.
*H04W 52/38* (2009.01)
*H04W 52/24* (2009.01)

(52) U.S. Cl.
CPC ....... *H04W 52/383* (2013.01); *H04W 52/242* (2013.01)

(58) Field of Classification Search
CPC .................. H04W 52/383; H04W 52/242
See application file for complete search history.

(56) References Cited

U.S. PATENT DOCUMENTS

2016/0330696 A1* 11/2016 Suzuki ............... H04W 52/383
2017/0289869 A1* 10/2017 Nogami ........... H04W 36/0077
2019/0116586 A1* 4/2019 Basu Mallick ....... H04W 72/51
(Continued)

FOREIGN PATENT DOCUMENTS

JP    2018029323 A    2/2018

OTHER PUBLICATIONS

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

(Continued)

*Primary Examiner* — Ariel A Balaoing
(74) *Attorney, Agent, or Firm* — Seed Intellectual Property Law Group LLP

(57) ABSTRACT

This terminal comprises: a control circuit that controls transmission power of a sidelink on the basis of information about a power control method corresponding to the purpose of usage of a communication link at a base station; and a transmission circuit that carries out sidelink transmission in accordance with the control of the transmission power.

9 Claims, 23 Drawing Sheets

(56) References Cited

U.S. PATENT DOCUMENTS

| | | | |
|---|---|---|---|
| 2019/0173612 A1* | 6/2019 | Kimura | H04L 1/0063 |
| 2019/0208441 A1* | 7/2019 | Wang | H04W 24/10 |
| 2020/0260386 A1* | 8/2020 | Ryu | H04W 76/14 |
| 2021/0250878 A1* | 8/2021 | Liu | H04W 52/10 |
| 2022/0053428 A1* | 2/2022 | Hwang | H04W 52/367 |
| 2022/0191945 A1* | 6/2022 | Yamamoto | H04W 74/0833 |

OTHER PUBLICATIONS

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical layer procedures for control (Release 16)," 3GPP TS 38.213 V16.2.0, Jun. 2020. (176 pages).

3GPP, "3rd Generation Partnership Project; Technical Specification Group Radio Access Network; NR; Study on NR Vehicle-to-Everything (V2X) (Release 16)," 3GPP TR 38.885 V16.0.0, Mar. 2019. (122 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

International Search Report, mailed Aug. 10, 2021, for International Patent Application No. PCT/JP2021/023674. (5 pages) (with English Translation).

International Telecommunication Union, "IMT Vision—Framework and overall objectives of the future development of IMT for 2020 and beyond; M Series; Mobile, radiodetermination, amateur and related satellite services," Recommendation ITU-R M.2083-0, Sep. 2015. (21 pages).

LG Electronics, "WID revision: NR sidelink enhancement," RP-201385, revision of RP-201283, Agenda Item: 9.10.3, 3GPP TSG RAN Meeting #88e, Electronic Meeting, Jun. 29-Jul. 3, 2020. (6 pages).

* cited by examiner

200

| Slot number | 0 | 1 | 2 | 3 | 4 | 5 | 6 | 7 | 8 | 9 |
|---|---|---|---|---|---|---|---|---|---|---|
| Set Id | 0 | 0 | 0 | 0 | 1 | 1 | 1 | 2 | 2 | 2 |

FIG. 13

| Slot number | 0 | 1 | 2 | 3 | 4 | 5 | 6 | 7 | 8 | 9 |
|---|---|---|---|---|---|---|---|---|---|---|
| UL or DL | DL | DL | DL | DL | DL | UL | UL | UL | UL | UL |

FIG. 14

TERMINAL AND COMMUNICATION METHOD

TECHNICAL FIELD

The present disclosure relates to a terminal and a communication method.

BACKGROUND ART

A communication system called the fifth-generation mobile communication system (5G) has been studied. In 5G, flexibly providing functions for respective use cases that require increasing communication traffic, increasing the number of terminals to be connected, high reliability, and low latency has been studied. In the 3rd Generation Partnership Project (3GPP), which is an international standards organization, the advancement of communication systems in terms of both the advancement of Long Term Evolution (LTE) systems and New Radio (NR) has been studied.

In 3GPP, supporting vehicle to everything (V2X) in LTE systems has been studied earlier. Supporting V2X in NR in which a wider band than in LTE systems can be used has also been studied (e.g., see Non Patent Literature (hereinafter, referred to as NPL) 1). Further, in NR, not only V2X, but also further enhancement of communications using Sidelink (SL) has been studied (e.g., see NPL 2).

CITATION LIST

Non Patent Literature

NPL 1
3GPP TR 38.885 V16.0.0, "Study on NR Vehicle-to-Everything (V2X) (Release 16)," 2019-03
NPL 2
3GPP TSG RAN Meeting #88e, RP-201385, "WID revision: NR sidelink enhancement", LG Electronics, June 2020
NPL 3
3GPP TS 38.213 V16.2.0. "Physical layer procedures for control (Release 16)", 2020-06

SUMMARY OF INVENTION

There is scope for further study, however, on a method for controlling transmission power in a sidelink.

One non-limiting and exemplary embodiment of the present disclosure facilitates providing a terminal and a communication method each capable of enhancing efficiency of transmission power control of a sidelink.

A terminal according to an embodiment of the present disclosure includes: control circuitry, which, in operation, performs control of transmission power of a sidelink based on information on a power control method that depends on a use of a communication link in a base station; and transmission circuitry, which, in operation, performs sidelink transmission in accordance with the control of the transmission power.

It should be noted that general or specific embodiment may be implemented as a system, a method, an integrated circuit, a computer program, a storage medium, or any selective combination thereof.

According to an embodiment of the present disclosure, it is possible to enhance the efficiency of transmission power control of a sidelink.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 13 illustrates exemplary information on configuration timing of a power control (PC) parameter:
FIG. 14 illustrates another exemplary information on configuration timing of a PC parameter.

DESCRIPTION OF EMBODIMENTS

Figure 1:
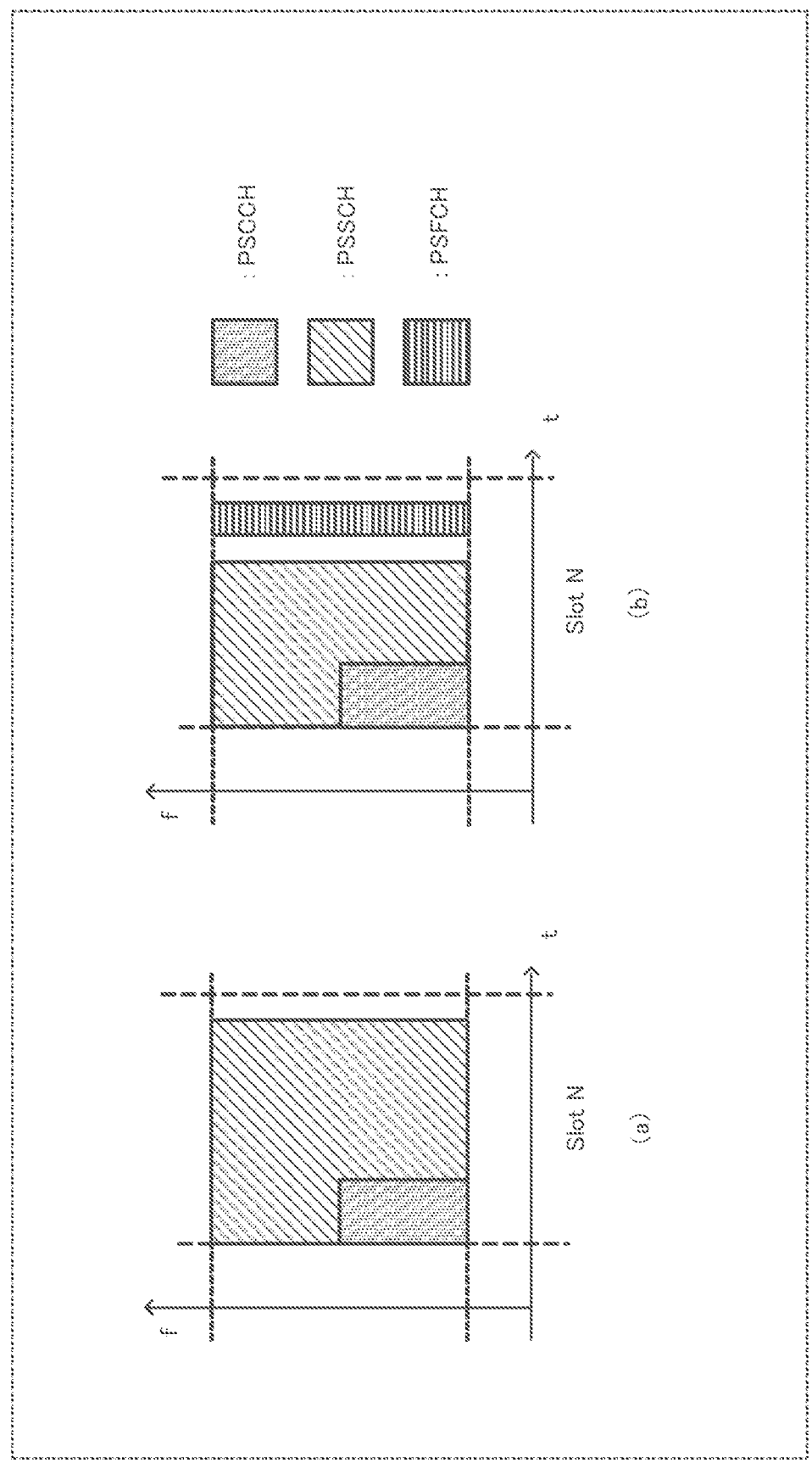
FIG. 1 illustrates an exemplary mapping in a slot of a sidelink.

Hereinafter, an embodiment of the present disclosure will be described in detail with reference to the accompanying drawings.
[Description of V2X]
In V2X, vehicle to vehicle (V2V: Vehicle to Vehicle), vehicle to road (V2I: Vehicle to Infrastructure), vehicle to pedestrian (V2P: Vehicle to Pedestrian), and vehicle to network (V2N: Vehicle to Network) communications are assumed, and in V2V, V2I, and V2P, terminals can directly communicate (e.g., at least one of transmission and reception) with each other using a link called a sidelink (SL: Sidelink) or PC5 without via a network with a base station. In V2N, it is assumed that communication is performed through a link called a Uu between a base station (e.g., gNB in NR and eNB in LTE) and a terminal (e.g., UE: User Equipment).

For example, in NR V2X of Release 16, a resource used for the sidelink is configured by a SL Band width part (BWP) and a resource pool. The SL BWP may specify a frequency band usable for the sidelink, and may be configured separately from DL BWP or UL BWP configured for base station-to-terminal (Uu). Also, a frequency band of SL BWP may overlap with UL BWP.

The resource pool includes, for example, at least one of a resource in a frequency direction and/or a resource in a time direction specified in a resource in SL BWP. A plurality of resource pools may be configured in one terminal.

[Description of Sidelink in NR]

The sidelink transmission may be performed in a unit (e.g., slot unit) obtained by dividing a time resource, for example. A slot available for the sidelink transmission may be defined as a slot including symbols for uplink (uplink symbols) equal to or greater than an X symbol (X represents a parameter) in number in the operation of base station-to-terminal Uu link.

Further, for V2X of NR, it has been discussed to support unicast, groupcast, and broadcast in the sidelink communication (e.g., at least one of transmission and reception).

In unicast, for example, one-to-one transmission from a transmission terminal (e.g., also referred to as transmitter UE or TX UE) to a reception terminal (e.g., referred to as receiver UE or RX UE) is assumed. In groupcast, for example, transmission from a transmission terminal to a plurality of reception terminals included in a certain group is assumed. In broadcast, for example, transmission from a transmission terminal that does not specify a reception terminal is assumed.

[Description of SL Channel]

For SL of NR, channel configurations such as PSCCH (physical SL control channel), PSSCH (physical SL shared channel), PSFCH (physical SL feedback channel), and PSBCH (physical SL broadcast channel) are discussed.

PSCCH is an example of a control channel in SL, and PSSCH is an example of a data channel in SL. PSFCH is an example of a channel used for transmission of a feedback signal in SL, and PSBCH is an example of a broadcast channel used for transmission that does not specify a reception terminal. In the following description, the terms "signal" and "information" may be replaced with each other depending on the context.

In PSCCH, for example, a control signal (or control information) called sidelink control information (SCI) is mapped. The SCI includes, for example, information (or a parameter) relating to at least one of transmission and reception (e.g., decoding) of PSSCH, such as information on resource allocation of a data signal (e.g., PSSCH).

The information content of SCI may be divided (or classified) into, for example, first information (or control information) and second information (or control information). The "first control information" and the "second control information" may be referred to as, for example, "1st stage SCI" and "2nd stage SCI", respectively.

In PSSCH, a data signal or a data signal and SCI (e.g., 2nd stage SCI) are mapped, for example.

In PSFCH, for example, a feedback signal (e.g., a hybrid automatic repeat request (HARQ) feedback) to PSSCH (e.g., a data signal) is mapped. The feedback signal may include, for example, a response signal (e.g., ACK/NACK information, also referred to as HARQ-ACK) indicating ACK or NACK.

In PSBCH, for example, a broadcast signal that does not specify a reception terminal is mapped. PSBCH is, for example, transmitted together with a sidelink Primary synchronization signal (S-PSS) and a sidelink secondly synchronization signal (S-SSS), which are signals for synchronization, and thus, may be collectively referred to as a sidelink synchronization signal block (S-SSB).

FIG. 1 illustrates an exemplary mapping of PSCCH, PSSCH, and PSFCH in a slot. For example, PSFCH may not be mapped depending on the configuration. Further, PSSCH may include, for example, a reference signal for data demodulation (e.g., DMRS: Demodulation Reference Signal) (not illustrated). Note that, as described above, PSBCH may be transmitted together with a synchronization signal, for example.

[Description of SL Mode]

For example, two modes (e.g., Mode 1 and Mode 2) are defined as resource allocation methods of SL communication.

In Mode 1, for example, the base station determines (in other words, schedules) a resource (e.g., referred to as SL resource) to be used by the terminal in SL.

In Mode 2, for example, the terminal autonomously selects (or determines) a resource to be used for SL from resources in a preset resource pool. In other words, in Mode 2, the base station need not schedule a SL resource.

For example, Mode 1 is assumed to be used in an environment in which the terminal and the base station are connected with each other and the terminal performing sidelink communication can receive indication (or notification) from the base station. On the other hand, in Mode 2, for example, the terminal can determine a resource to be used for SL even when there is no indication from the base station. Thus, sidelink communication is possible while covering a terminal under the control of a different operator or a terminal outside the coverage, for example.

Note that, even in an environment in which the terminal can receive an indication from the base station, Mode 2 may be applied to the terminal because the base station does not support the function of Mode 1, for example.

In NR V2X of Rel-16, for example, either Mode 1 or Mode 2 is configured for one terminal. On the other hand, in NR V2X of Rel-17, for example, it has been discussed to support the configuration of both Mode 1 and Mode 2 in addition to the configuration of either Mode 1 or Mode 2 for one terminal. This allows more flexible resource allocation for the sidelink transmission.

[Description of NR V2X Transmission Power Control]

The transmission power $P_{PSSCH}(i)$ [dBm] for PSSCH of NR V2X is calculated, for example, according to Equation 1 (see, e.g., NPL 3).

$$P_{PSSCH}(i) = \min(P_{CMAX}, P_{CBR}, \min(P_{PSSCH,D}(i), P_{PSSCH,SL}(i))) \quad \text{(Equation 1)}$$

In Equation 1, i represents a slot number. $P_{CMAX}$ indicates the maximum transmission power [dBm] of the terminal, and $P_{CBR}$ indicates the maximum transmission power [dBm] of the sidelink. Further, $P_{PSSCH,D}(i)$ is transmission power based on a path loss of a downlink (DL) between the base station and the terminal, and is calculated according to Equation 2. Furthermore, $P_{PSSCH,SL}(i)$ is a transmission power based on a path loss of a sidelink (e.g., a link between V2X terminals), and is calculated according to Equation 3.

$$P_{PSSCH,D}(i) = P_{O,D} + 10\log_{10}(2^\mu \cdot M_{RB}^{PSSCH}(i)) + \alpha_D \cdot PL_D \quad \text{(Equation 2)}$$

$$P_{PSSCH,SL}(i) = P_{O,SL} + 10\log_{10}(2^\mu \cdot M_{RB}^{PSSCH}(i)) + \alpha_{SL} \cdot PL_{SL} \quad \text{(Equation 3)}$$

In Equations 2 and 3, $P_{O,D}$ indicates target reception power [dBm] (parameter value) for the downlink between the base station and the terminal, and $P_{O,SL}$ indicates target reception power [dBm] (parameter value) for the sidelink. Further, $\alpha_D$ indicates a path loss compensation rate (parameter value) for the downlink between the base station and the terminal, and $\alpha_{SL}$ indicates a path loss compensation rate (parameter value) for the sidelink. Furthermore, $2^\mu \cdot M_{RB}^{PSSCH}(i)$ indicates a PSSCH transmission bandwidth [PRB] normalized based on 15 kHz SCS, which is one of the subcarrier spacing (SCS) applied for PSSCH in slot number i. $PL_D$ indicates a path loss [dB] of the downlink between the base station and the terminal, and $PL_{SL}$ indicates a path loss [dB] of the sidelink.

In this case, a combination of the target reception power and the path loss compensation rates (e.g., ($P_{O,D}$, $\alpha_D$) and ($P_{O,SL}$, $\alpha_{SL}$)) is referred to as a "transmission power control parameter" or a "Power Control (PC) parameter". The PC parameter may also be referred to as an open loop PC parameter, for example.

For example, $P_{PSSCH,D}(i)$ described in Equations 1 and 2 can control the interference power that PSSCH (in other words, sidelink communication) gives to the base station (in other words, Uu link communication). The base station may, for example, control a PC parameter ($P_{O,D}$, $\alpha_D$) relating to transmission power based on the path loss of the downlink described in Equation 2 so that the interference level by PSSCH is equal to or less than an acceptable value.

Further, for example, the reception power of the sidelink can be controlled by $P_{PSSCH,SL}(i)$ described in Equation 1 and Equation 3. The base station may control a PC parameter ($P_{O,D}$, $\alpha_D$) relating to transmission power based on the path loss of the sidelink described in Equation 3 so that the terminal can transmit and receive data of a desired throughput using the sidelink.

PC parameters such as ($P_{O,D}$, $\alpha_D$) and ($P_{O,SL}$, $\alpha_{SL}$) may be configured (or notified or indicated) from the base station to the terminal by higher layer signaling (e.g., also referred to as Radio Resource Control (RRC) layer signaling or a higher layer parameter).

Figure 2:
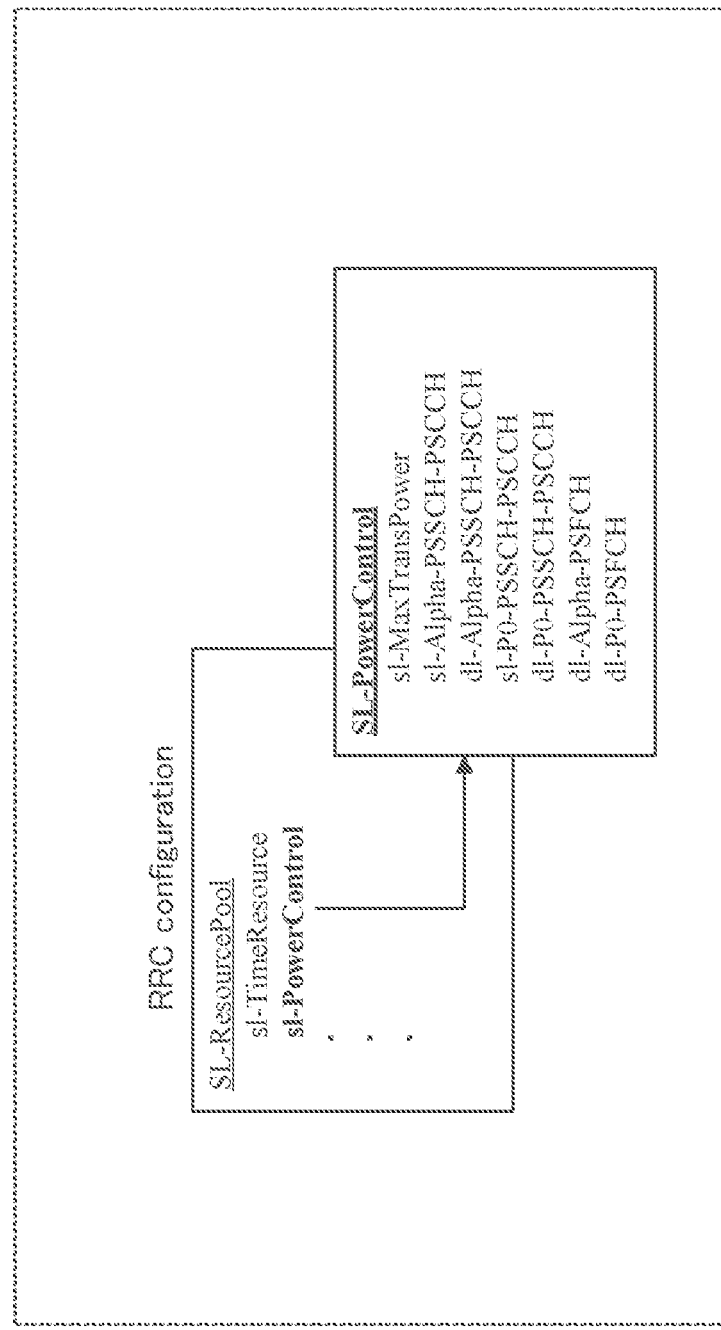
FIG. 2 illustrates an exemplary parameter configuration of transmission power control for a sidelink.

For example, in NR V2X of Rel-16, as illustrated in FIG. 2, parameter information (e.g., "SL-PowerControl") relating to transmission power control of the sidelink may be included in parameter information (e.g., "SL-Resource-Pool") indicating a resource pool configuration of the sidelink. The SL-PowerControl may include, for example, the above-described two types of PC parameters ($P_{O,D}$, $\alpha_D$) and ($P_{O,SL}$, $\alpha_{SL}$). For example, in FIG. 2, sl-Alpha-PSSCH-PSCCH corresponds to $\alpha_{SL}$, dl-Alpha-PSSCH-PSCCH corresponds to $\alpha_D$, sl-P0-PSSCH-PSCCH corresponds to $P_{O,SL}$, and dl-P0-PSSCH-PSCCH corresponds to $P_{O,D}$. Note that the names of the parameters are not limited to the examples illustrated in FIG. 2, and may be other names.

Note that, as illustrated in FIG. 1, PSCCH is multiplexed in a frequency domain and a time domain in a slot in common with PSSCH, and thus the same transmission power control as PSSCH may be applied. In other words, transmission power may be calculated using a PC parameter common to PSSCH and PSCCH. Note that the case is not limited to the case where a PC parameter common to both PSSCH and PSCCH is used, and PC parameters individual (e.g., different) for PSSCH and PSCCH may be configured, respectively.

In the transmission power control for sidelink data transmission (PSSCH) of NR V2X, for example, when the transmission power based on the path loss of the downlink ($P_{PSSCH,D}(i)$) is smaller than the transmission power based on the path loss of the sidelink ($P_{PSSCH,SL}(i)$), the transmission power based on the path loss of the downlink ($P_{PSSCH,D}(i)$) may be applied, as described in Equation 4.

$$P_{PSSCH}(i) = \min(P_{CMAX}, P_{CBR}, \min(P_{PSSCH,D}(i), P_{PSSCH,SL}(i))) = \min(P_{CMAX}, P_{CBR}, P_{PSSCH,D}(i)) \quad \text{(Equation 4)}$$

Figure 3:
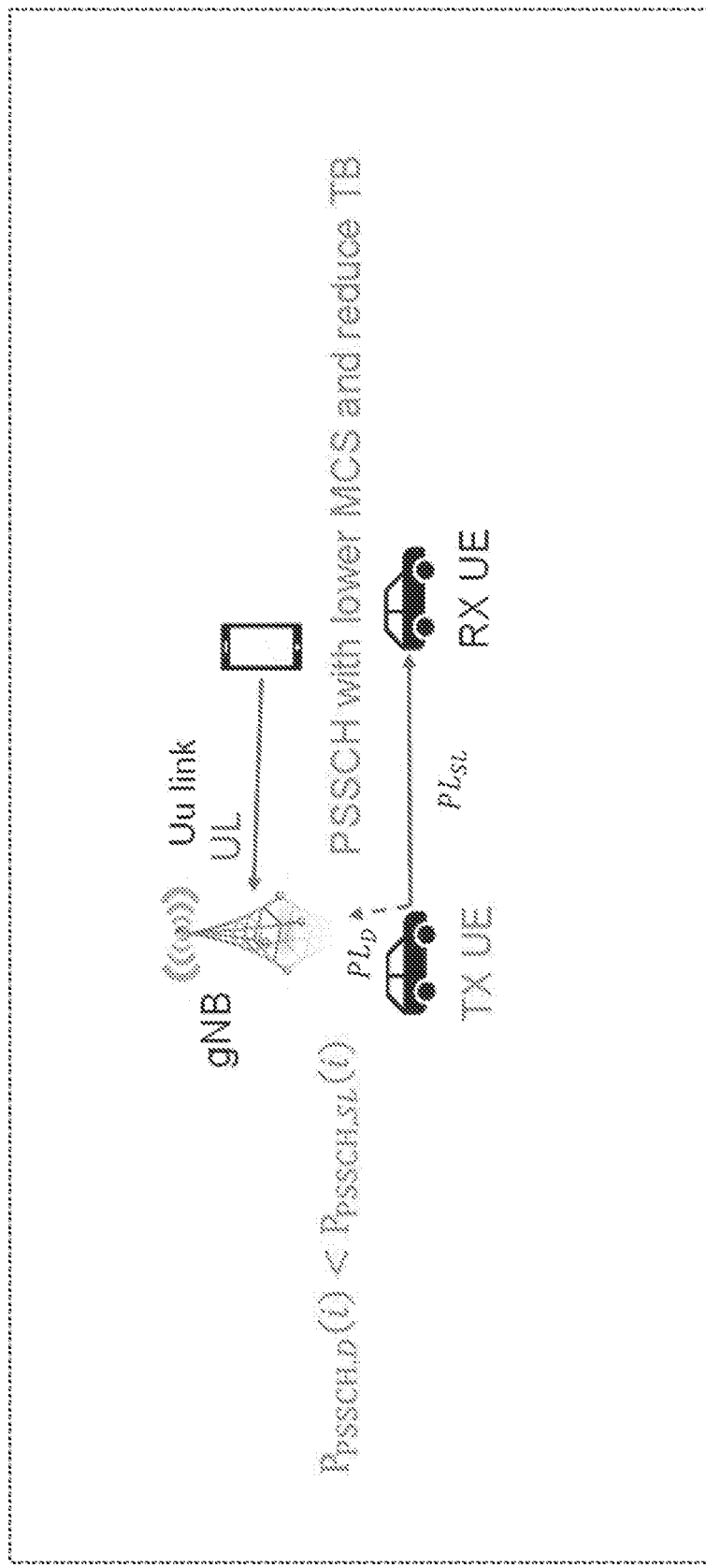
FIG. 3 illustrates exemplary communications of a Uu link and the sidelink.

For example, as illustrated in FIG. 3, as the position of the terminal (V2X terminal as an example, e.g., TX UE) performing sidelink communication is closer to the base station (e.g., gNB) (e.g., when the terminal is present within a predetermined distance), the path loss of the downlink between the base station and the terminal (e.g., TX UE) (e.g., $PL_D$ in Equation 2) is smaller than the path loss ($PL_{SL}$ in Equation 3) between V2X terminals (e.g., TX UE and RX UE), and thus the above-described situation (e.g., the situation where Equation 4 is applied) is likely to occur.

Further, for example, when a PC parameter is semi-statically configured to the terminal by an RRC layer, it is difficult to dynamically switch the PC parameter. Thus, in a V2X terminal (e.g., TX UE) illustrated in FIG. 3, transmission power in accordance with Equation 4 is applied based on the PC parameter configured for reducing giving interference to the base station; therefore, the transmission power of the sidelink is easily limited. In other words, in a V2X terminal illustrated in FIG. 3, transmission power ($P_{PSSCH,SL}(i)$) based on the path loss of the sidelink is less likely to be applied.

Thus, the V2X terminal (e.g., TX UE illustrated in FIG. 3) may, for example, reduce the data amount transmitted by PSSCH and configure modulation scheme and coding rate (MCS: Modulation and Codding Scheme) having a higher robustness to transmit PSSCH in order to maintain reliability of data reception performance with low transmission power compared to transmission power $P_{PSSCH,SL}(i)$. This may reduce (or limit) the throughput of data transmission by the sidelink.

Therefore, in the embodiment of the present disclosure, a method of enhancing efficiency of transmission power control of the sidelink will be described. Enhancing efficiency of sidelink transmission power control can enhance throughput of data transmission in the sidelink communication.

In this case, for example, appropriate transmission power for a terminal (e.g., V2X terminal) performing sidelink transmission may vary depending on the use of the Uu link (or the operation of the Uu link, e.g., configuration or switching to uplink (UL) or downlink (DL)).

Figure 4:
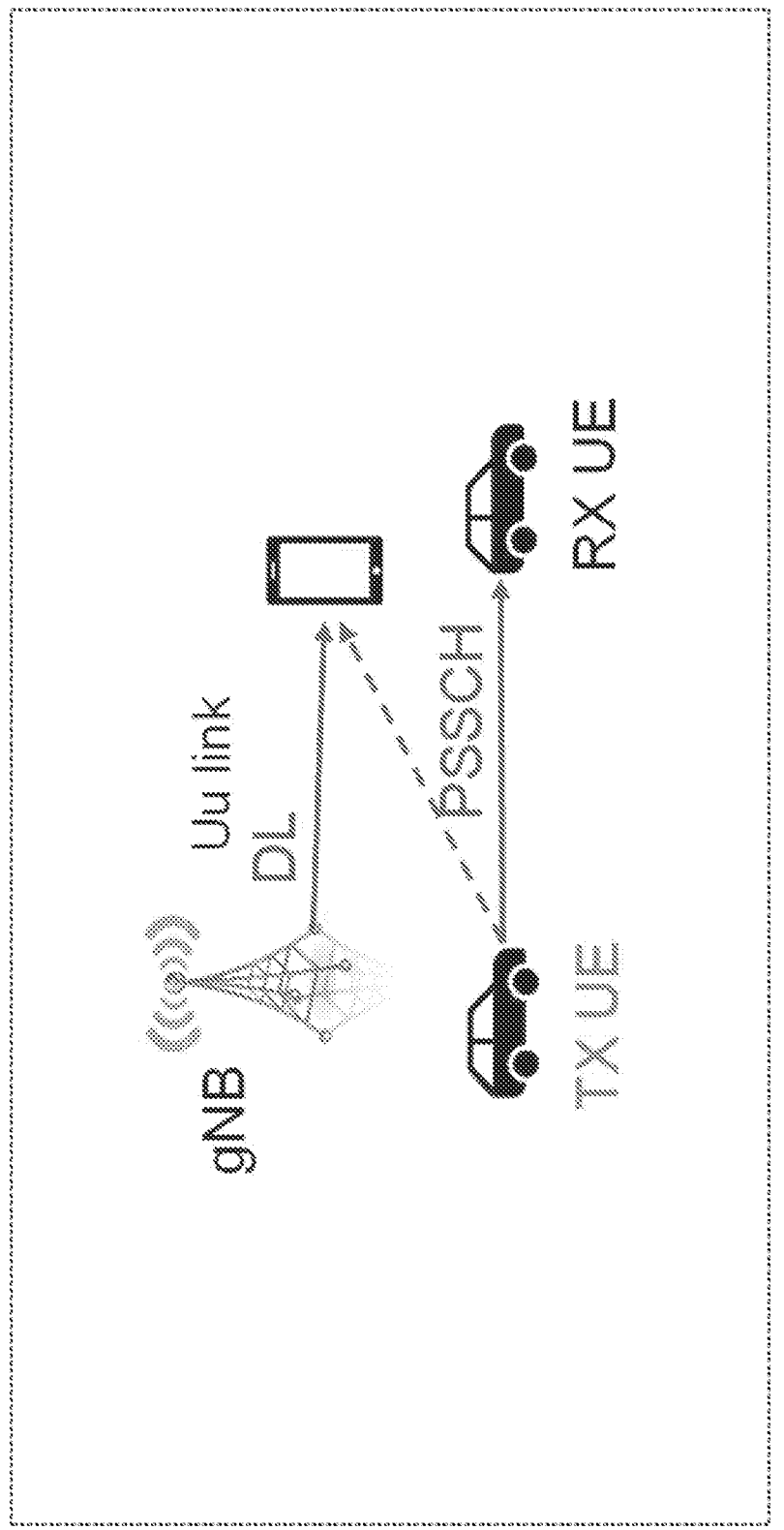
FIG. 4 illustrates another exemplary communication of the Uu link and the sidelink.
Figure 5:
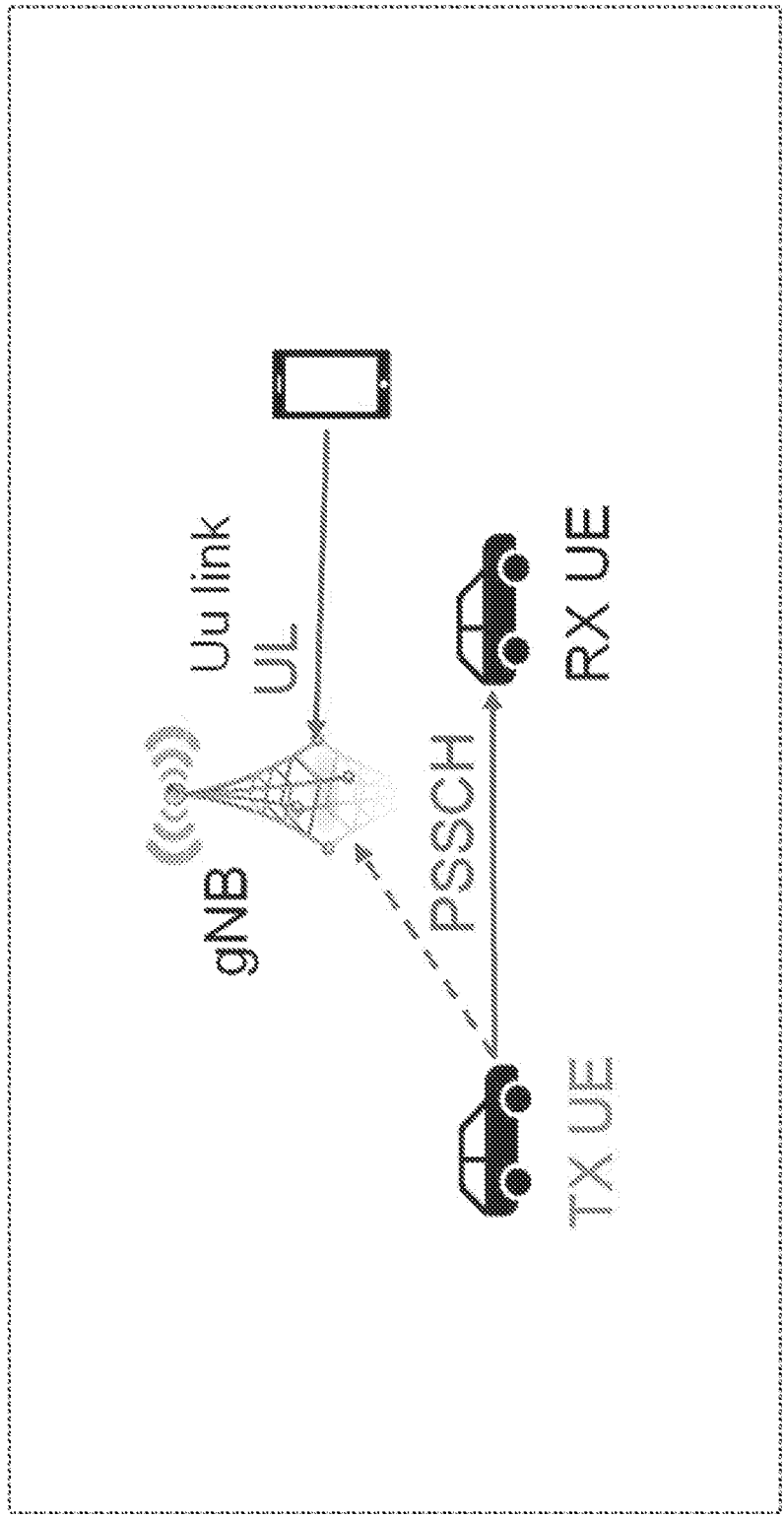
FIG. 5 illustrates still another exemplary communication of the Uu link and the sidelink.

FIG. 4 illustrates an example in which the Uu link is used for DL communication, and FIG. 5 illustrates an example in which the Uu link is used for UL.

As illustrated in FIG. 4, in a case where the base station (e.g., gNB) uses the Uu link for DL communication (e.g., operates the Uu link in DL), when a V2X terminal (e.g., TX UE) transmitting PSSCH is present around the base station (e.g., the terminal is present within a predetermined distance), the base station that transmits a downlink signal of the Uu link is less likely to be interfered with by the V2X terminal, and thus transmission power of PSSCH transmitted from the V2X terminal can be configured to be higher (e.g., can be configured based on the path loss of the sidelink).

Note that, in FIG. 4, the PSSCH transmitted from the V2X terminal may interfere with the terminal receiving a downlink signal of the Uu link. However, the base station can schedule downlink transmission so as to reduce the influence of the interference, for example, by grasping the position information of the terminal in advance. For example, scheduling downlink transmission to a terminal farther from the V2X terminal can reduce the interference caused by the PSSCH with the terminal receiving the downlink signal.

Further, in a case where the base station (e.g., gNB) uses the Uu link for DL communication, when a V2X terminal (e.g., TX UE) transmitting PSSCH is not present around the base station (e.g., the terminal is located farther than the predetermined distance) (not illustrated), the path loss between the base station and the V2X terminal increases, and $P_{PSSCH,SL}$ (i) is likely to be smaller than $P_{PSSCH,D}$ (i)) in Equation 1; therefore, the PSSCH transmission power may be configured based on the path loss of the sidelink.

Further, as illustrated in FIG. 5, in a case where the base station (e.g., gNB) uses the Uu link for UL communication (e.g., operates the Uu link in UL), when a V2X terminal (e.g., TX UE) transmitting PSSCH is not present around the base station (e.g., the terminal is located farther than the predetermined distance) the path loss between the base station and the V2X terminal increases, and $P_{PSSCH,SL}$(i) is likely to be smaller than $P_{PSSCH,D}$(i)) in Equation 1; therefore, the PSSCH transmission power can be configured to be larger (e.g., based on the path loss of the sidelink).

Note that, in a case where the base station (e.g., gNB) uses the Uu link for UL communication, when a V2X terminal (e.g., TX UE) transmitting PSSCH is present around the base station (e.g., the terminal is present within a predetermined distance), the pass loss between the base station and the V2X terminal is smaller, and $P_{PSSCH,D}$(i) is likely to be smaller than $P_{PSSCH,SL}$(i)) in Equation 1; therefore, the PSSCH transmission power may be configured (in other words, limited) based on the path loss of the downlink.

As described above, an appropriate setting value of PSSCH transmission power transmitted from the terminal performing sidelink communication may vary depending on the use of the Uu link (in other words, the operation of the communication link by the base station).

For example, when the Uu link is used for UL communication, the transmission power of PSSCH may be configured in accordance with the distance between the terminal performing sidelink communication and the base station. On the other hand, when the Uu link is used for DL communication, the transmission power of PSSCH can be configured to the transmission power based on the path loss of the sidelink regardless of the distance between the terminal performing the sidelink communication and the base station.

Then, the base station may configure, to one terminal (e.g., V2X terminal), a plurality of PC parameters individual for the uses (e.g., either DL or UL) of the Uu link by the base station, for example. For example, the terminal may perform transmission power control for the sidelink based on any one of the plurality of configured PC parameters.

This transmission power control of the sidelink communication based on the use (or operation) of the DL and the UL in the Uu link can enhance the efficiency of transmission power control of the sidelink and can enhance throughput of data transmission by the sidelink.

Furthermore, for example, a further increase in number of cells each having a smaller cell radius (small cell) is possible in future systems. Because the number of terminals accommodated in a small cell is smaller than in a macro cell, the system performance can be enhanced by dynamically changing a ratio of DL and UL in the Uu link in accordance with the traffic state of the terminal in the small cell. For example, in the small cell, the switching of transmission power control of the sidelink in accordance with the above-described use of the Uu link is expected to enhance throughput of data to be transmitted in the sidelink.

[Overview of Communication System]

A communication system according to the embodiment of the present disclosure may include, for example, base station 100 (e.g., gNB or eNB) and terminal 200 (e.g., a terminal performing sidelink communication such as V2X communication). The number of terminals 200 may be one or more, but is more than one when focusing on the sidelink communication.

Figure 6:
FIG. 6 is a block diagram illustrating an exemplary partial configuration of a terminal.

FIG. 6 is a block diagram illustrating an exemplary partial configuration of terminal 200 according to the embodiment of the present disclosure. In terminal 200 illustrated in FIG. 6, a controller (e.g., corresponding to control circuitry) controls transmission power of the sidelink based on information (e.g., PC parameter) relating to the power control method that depends on the use of the communication link in the base station. A transmitter (e.g., corresponding to transmission circuitry) performs sidelink transmission in accordance with the control of transmission power.

[Configuration of Base Station]

Figure 7:
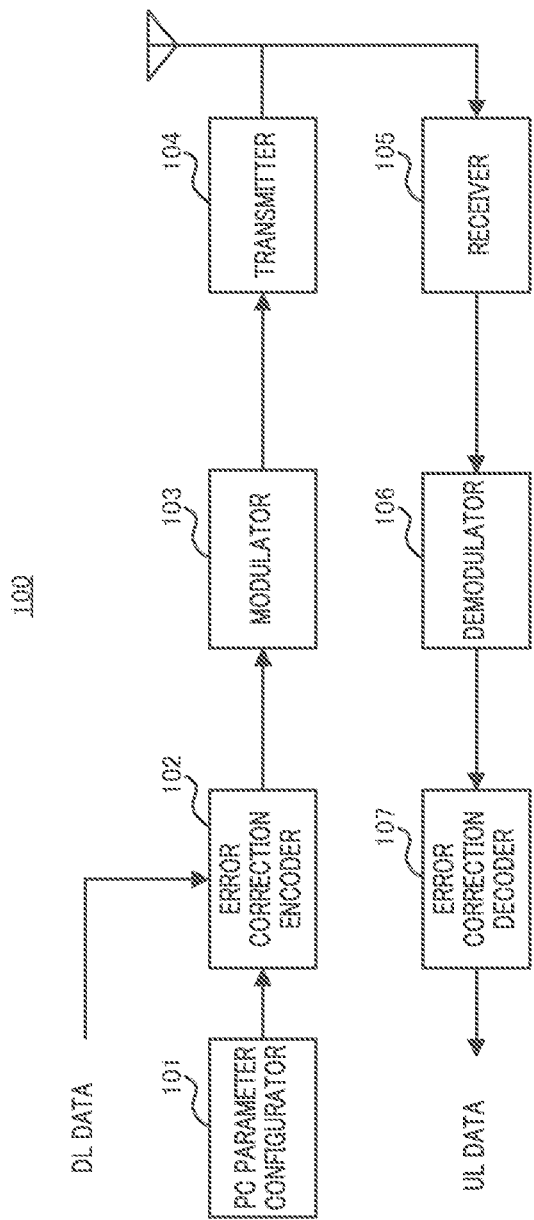
FIG. 7 illustrates an exemplary configuration of a base station.

FIG. 7 is a block diagram illustrating an exemplary configuration of base station 100 according to the embodiment of the present disclosure. In FIG. 7, base station 100 may include PC parameter configurator 101, error correction encoder 102, modulator 103, transmitter 104, receiver 105, demodulator 106, and error correction decoder 107, for example.

PC parameter configurator 101 configures, for example, a PC parameter for terminal 200. For example, PC parameter configurator 101 may configure a parameter to be configured to terminal 200 based on the information relating to terminal 200 such as the position information of terminal 200 or the reception quality fed back in advance from terminal 200. PC parameter configurator 101 may output the configuration information of an RRC layer including control information (e.g., transmission power control information for SL) indicating the configured PC parameter to error correction encoder 102.

Note that an exemplary configuration of a plurality of PC parameters in PC parameter configurator 101 will be described later.

Further, in the present embodiment, as an example, a case will be described in which base station 100 generates information to be transmitted in the higher layer (e.g., RRC layer) in PC parameter configurator 101, and configures transmission of the information relating to the PC parameter configuration to terminal 200. However, the configuration of the PC parameter is not limited thereto, and for example, the PC parameter may be configured in the application layer called Pre-configured or may be configured in advance in Subscriber Identity Module (SIM), and terminal 200 can operate without configuration from base station 100.

Error correction encoder 102 inputs transmission data signal (DL data) and higher layer signaling input from PC parameter configurator 101, performs error correction encoding on the input signal, and outputs the encoded signal to modulator 103.

For example, modulator 103 performs modulation processing on the signal input from error correction encoder 102, and outputs the modulated data signal to transmitter 104.

Note that, when the modulated data signal after the modulation is an Orthogonal Frequency Division Multiplexing (OFDM) signal, base station 100 (e.g., modulator 103) may form the OFDM signal by mapping the modulated signal to a frequency resource, performing Inverse Fast Fourier Transform (IFFT) processing to convert the signal to time waveform, and adding Cyclic Prefix (CP).

For example, transmitter 104 performs radio transmission processing such as up-conversion, digital-to-analog (D/A) conversion, and amplification on the transmission signal input from modulator 103, and transmits the radio signal from an antenna to terminal 200.

Receiver 105 receives, for example, a signal transmitted from terminal 200 via the antenna, performs radio reception processing such as down-conversion and analog-to-digital (A/D) conversion, and outputs the obtained reception signal to demodulator 106.

Demodulator 106, for example, performs demodulation processing on the input signal, and outputs the obtained signal to error correction decoder 107. Note that, when the input signal is an OFDM signal, base station 100 (e.g., demodulator 106) may perform CP cancellation processing and Fast Fourier Transform (FFT) processing.

For example, error correction decoder 107 decodes the signal input from demodulator 106 to obtain a received data signal (UL data) from terminal 200.

When the resource allocation method of the sidelink communication is Mode 1, SCI transmitted by terminal 200 on the sidelink may be generated by base station 100 (e.g., PC parameter configurator 101 or another block (not illustrated)). The SCI generated by base station 100 may be transmitted to terminal 200, for example, as a higher layer signaling or a physical layer (e.g., PDCCH; Physical Downlink Control Channel) signal.

Exemplary Configuration of Terminal 200

Figure 8:
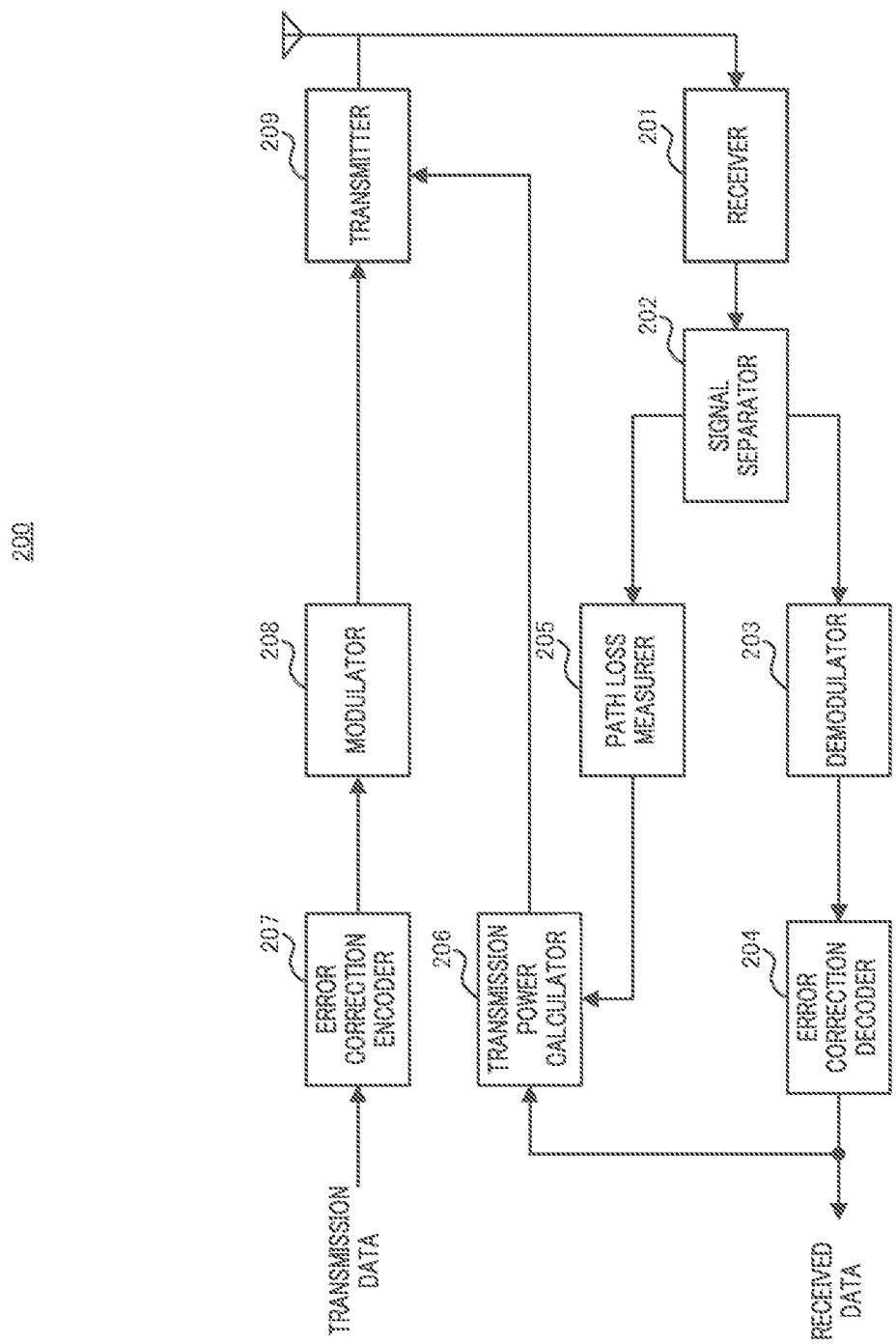
FIG. 8 illustrates an exemplary configuration of the terminal.

FIG. 8 is a block diagram illustrating an exemplary configuration of terminal 200 according to the present embodiment. In the sidelink communication, terminal 200 can be either a transmission terminal or a reception terminal.

In FIG. 8, terminal 200 may include, for example, receiver 201, signal separator 202, demodulator 203, error correction decoder 204, path loss measurer 205, transmission power calculator 206, error correction encoder 207, modulator 208, and transmitter 209.

For example, the controller illustrated in FIG. 6 may include signal separator 202, demodulator 203, error correction decoder 204, path loss measurer 205, transmission power calculator 206, error correction encoder 207, and modulator 208. Further, for example, the transmitter illustrated in FIG. 6 may include transmitter 209.

For example, receiver 201 receives a reception signal via an antenna, performs radio reception processing such as down conversion and A/D conversion, and outputs the obtained reception signal to signal separator 202.

Signal separator 202, for example, divides the reception signal input from receiver 201 into a received data signal from base station 100 or another terminal 200 (e.g., V2X terminal) and a reference signal from base station 100 or another terminal 200. Signal separator 202, for example, outputs the received data signal to demodulator 203, and outputs the reference signal to path loss measurer 205. Note that the reference signal may be, for example, a DMRS, Channel State Information (CSI)-RS, or a synchronization signal.

Demodulator 203, for example, performs demodulation processing on the received data signal input from signal separator 202, and outputs the demodulated signal to error correction decoder 204. When the input signal is an OFDM signal, terminal 200 (e.g., demodulator 203) may perform CP cancellation processing and Fast Fourier Transform (FFT) processing.

Error correction decoder 204, for example, decodes the demodulated signal input from demodulator 203, and outputs the decoded signal as the received data signal. Further, error correction decoder 204 outputs the transmission power control information for SL (e.g., including configuration information of a PC parameter) received in a higher layer to transmission power calculator 206.

Path loss measurer 205 may, for example, measure a path loss (e.g., PLO) of a downlink between base station 100 and terminal 200 based on the reference signal from base station 100 input from signal separator 202. Further, path loss measurer 205 may, for example, measures a path loss (e.g., $PL_{SL}$) of a sidelink between terminals 200 (e.g., V2X terminals) based on the reference signal from another terminal 200 input from signal separator 202. Path loss measurer 205 outputs the measured path loss value to transmission power calculator 206.

Transmission power calculator 206 calculates transmission power of PSSCH based on the transmission power control information for sidelink input from error correction decoder 204 and the path loss value input from path loss measurer 205, and outputs the calculated information relating to the transmission power of PSSCH to transmitter 209.

Note that an exemplary calculation of the transmission power in transmission power calculator 206 will be described later.

Error correction encoder 207, for example, inputs a data signal (e.g., transmission data of the sidelink), performs error correction encoding on the transmission data, and outputs the encoded signal to modulator 208.

Modulator 208, for example, modulates the signal input from error correction encoder 207, and outputs the modulated signal to transmitter 209. Note that, when the modulated signal is an OFDM signal, terminal 200 (e.g., modulator 208) may form the OFDM signal by performing IFFT processing after mapping the modulated signal on a frequency resource and adding CP.

For example, transmitter 209 performs radio transmission processing such as up conversion and D/A conversion on the input signal from modulator 208. Further, transmitter 209 transmits the signal after the radio transmission processing from the antenna based on the transmission power indicated by transmission power calculator 206.

[Operations of Base Station 100 and Terminal 200]

An exemplary operation of base station 100 and terminal 200 including the above-described configuration will be described.

In the present embodiment, the resource allocation method for sidelink communication is applicable to both Mode 1 and Mode 2.

Figure 9:
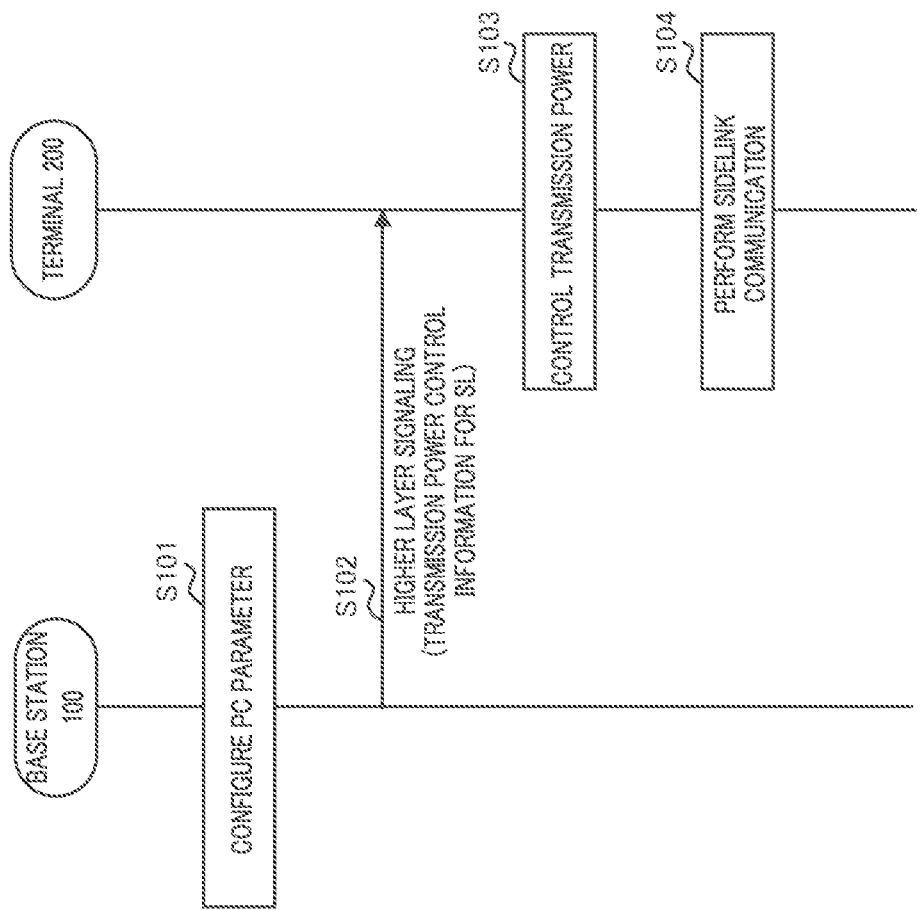
FIG. 9 is a sequence diagram illustrating an exemplary operation of the base station and the terminal.

FIG. 9 is a sequence diagram illustrating an exemplary operation of base station 100 and terminal 200.

Base station 100, for example, configures a PC parameter for terminal 200 (S101). For example, base station 100 may configure PC parameters corresponding to DL and UL of the Uu link, respectively.

Base station 100, for example, configures (or transmits or notifies) transmission power control information for SL including PC parameter configuration information to terminal 200 by higher layer signaling (e.g., RRC layer signal) (S102).

Terminal 200 performs, for example, transmission power control of the sidelink (S103). For example, terminal 200 may calculate transmission power (e.g., transmission power of PSSCH) in the sidelink communication based on the measured path loss and the transmission power control information for SL transmitted from base station 100.

Terminal 200, for example, performs sidelink communication (e.g., transmission of PSSCH) in accordance with the control of transmission power of the sidelink (S104).

[Method for Configuring PC Parameter]

An exemplary method for configuring a PC parameter in base station 100 (e.g., PC parameter configurator 101) will be described.

Base station 100 may, for example, configure a plurality of PC parameters (e.g., a target reception power and a path loss compensation rate) for PSSCH transmission individual for resource pools for terminal 200. Base station 100 and terminal 200 may, for example, use a plurality of PC parameters individual for the uses (e.g., either DL or UL) of the Uu link that is a communication link of base station 100. For example, the plurality of PC parameters may include parameters individual for DL and UL (or DL, UL or flexible link (FL)).

The PC parameter configured to be multiple (e.g., a plurality of candidates) may be a PC parameter (e.g., $P_{O,D}$ and $\alpha_D$ in Equation 2) relating to transmission power based on the path loss in the Uu link (e.g., DL).

For example, base station 100 may configure a PC parameter when the Uu link is used for DL (e.g., $P_{O,D,DL}$ and $\alpha_{D,DL}$), and a PC parameter when the Uu link is used for UL (e.g., $P_{O,D,UL}$ and $\alpha_{D,UL}$).

This PC parameter configuration allows base station 100 and terminal 200 to control transmission power (e.g., $P_{PSSCH,D}(i)$) based on the path loss of the downlink between base station 100 and terminal 200 in accordance with the use of the Uu link, and thus base station 100 and terminal 200 can appropriately control transmission power of PSSCH in consideration of the interference that the sidelink communication (e.g., transmission of PSSCH) gives to the Uu link.

For example, the PC parameter (e.g., $P_{O,D,DL}$ and $\alpha_{D,DL}$) when the Uu link is used for DL may be configured so that transmission power ($P_{PSSCH,D}(i)$) based on the path loss of DL is calculated to be lower than in the case where the Uu link is used for UL. According to this PC parameter configuration, for example, in Equation 1, transmission power ($P_{PSSCH,SL}(i)$) based on the path loss of the sidelink is likely to be smaller than transmission power ($P_{PSSCH,D}(i)$) based on the path loss of DL, and thus transmission power ($P_{PSSCH,SL}(i)$) based on the path loss of the sidelink is likely to be applied to $P_{PSSCH}(i)$ Of the transmission power of PSSCH. Therefore, for example, when the Uu link is used for DL, terminal 200 can transmit and receive desired throughput data using the sidelink.

Hereinafter, an exemplary configuration of transmission power control information for the sidelink including a plurality of PC parameters will be described.

Configuration Example 1

In Configuration Example 1, a plurality of PC parameters may be configured in transmission power control information for SL.

Figure 10:
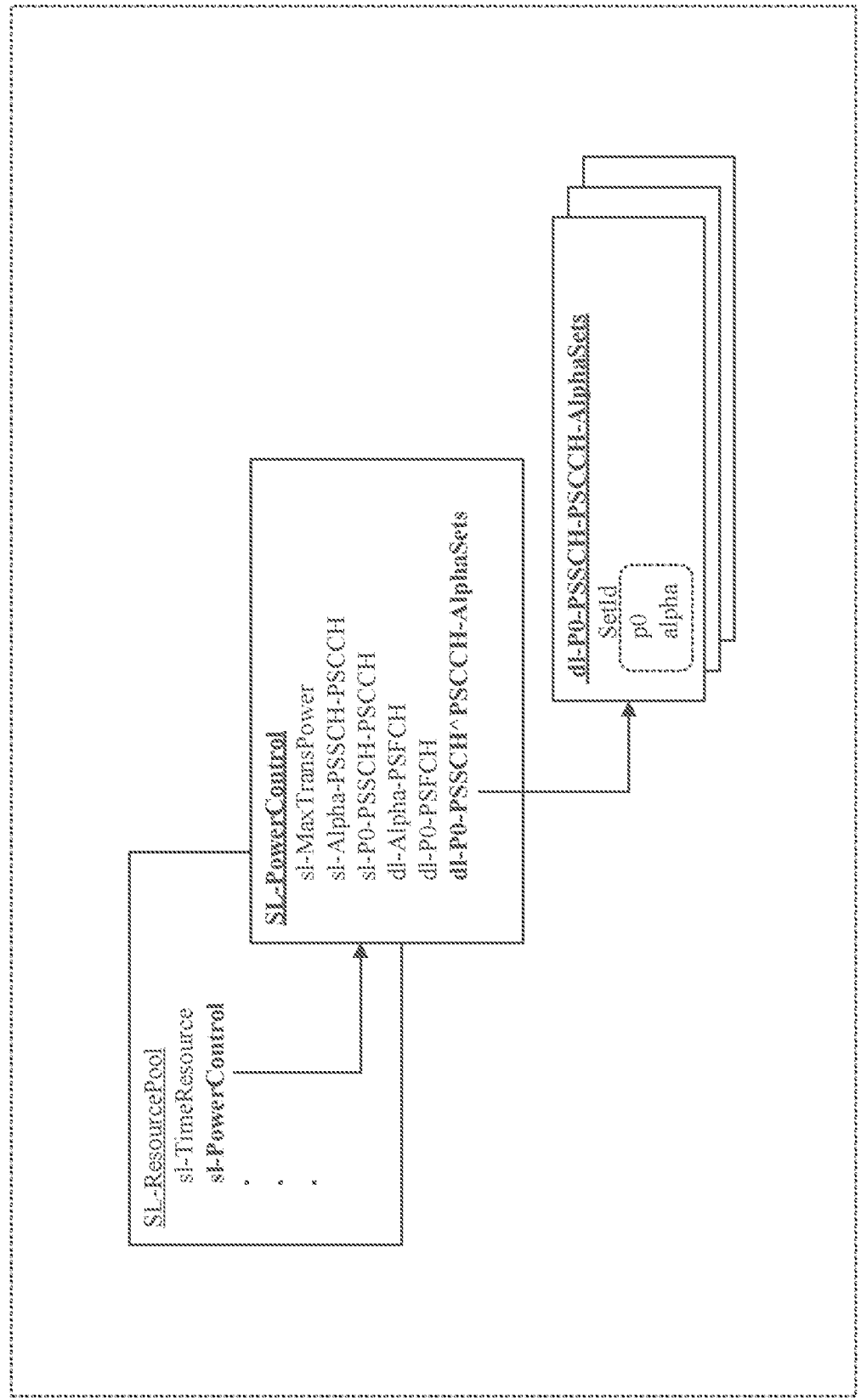
FIG. 10 illustrates an exemplary parameter configuration of transmission power control for the sidelink.

FIG. 10 illustrates exemplary parameter information (e.g., SL-ResourcePool) indicating a resource pool configuration for the sidelink in Configuration Example 1.

As illustrated in FIG. 10, configuration information (e.g., dL-P0-PSSCH-PSCCH-AlphaSets) including a plurality of PC parameter sets may be configured in transmission power control information for SL (e.g., SL-PowerControl) in SL-ResourcePool.

As illustrated in FIG. 10, the configuration information (DL-P0-PSSCH-PSCCH-AlphaSet) including a plurality of PC parameter sets may be defined by a PC parameter (e.g., target reception power (p0) and path loss compensation rate (alpha)) and information identifying the sets (e.g., set ID (SetId)). For example, PC parameters for transmission power calculation based on the path loss of DL ($P_{O,D}$ and $\alpha_D$) may be configured individually for the uses of the Uu link.

For example, p0=$P_{O,D,DL}$ and alpha=$\alpha_{D,DL}$ may be configured in the configuration information (DL-P0-PSSCH-PSCCH-AlphaSet) corresponding to the case where the Uu link is used for DL. Similarly, p0=$P_{O,D,UL}$ and alpha=$\alpha_{D,UL}$ may be configured in the configuration information (DL-P0-PSSCH-PSCCH-AlphaSet) corresponding to the case where the Uu link is used for UL. Further, for example, p0=$P_{O,D,FL}$ and alpha=$\alpha_{D,FL}$ may be configured in the configuration information (DL-P0-PSSCH-PSCCH-AlphaSet) corresponding to the use of the flexible link (FL) in which the Uu link is not either UL or DL (in other words, usable for either UL or DL).

Terminal 200 may, for example, select one PC parameter among PC parameters configured in terminal 200 based on the use (e.g., any of DL, UL, or FL) of the Uu link, and calculate transmission power of PSSCH based on the selected PC parameter. This transmission power control allows terminal 200 to reduce the interference giving to the Uu link and appropriately control transmission power of PSSCH.

Configuration Example 2

In configuration example 2, a PC parameter of the Uu link for DL and a PC parameter for UL may be configured in transmission power control information for SL.

Figure 11:
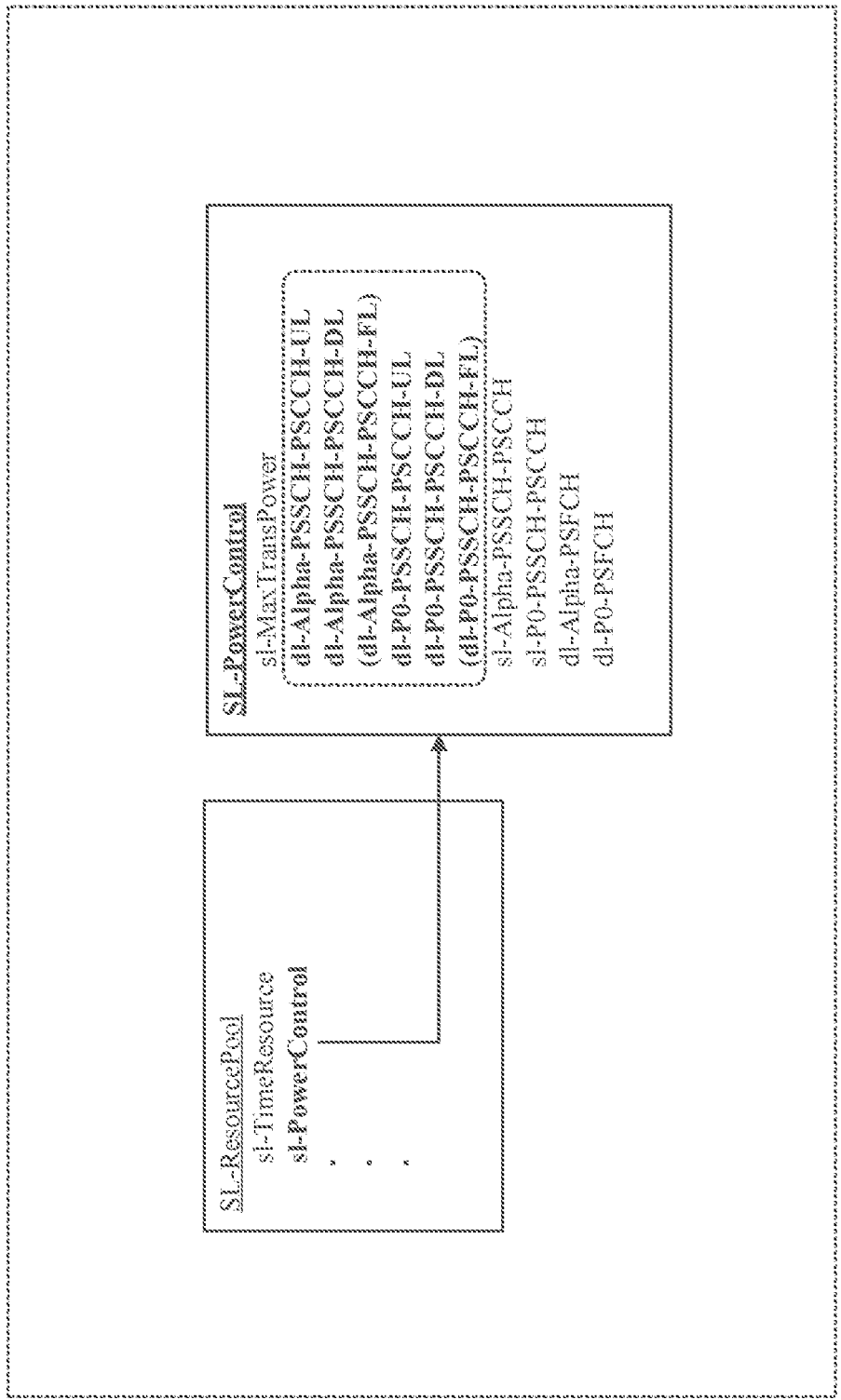
FIG. 11 illustrates an exemplary parameter configuration of transmission power control for the sidelink.

FIG. 11 illustrates exemplary parameter information (e.g., SL-ResourcePool) indicating a resource pool configuration of the sidelink in Configuration Example 2.

As illustrated in FIG. 11, configuration information (e.g., dL-P0-PSSCH-PSCCH-AlphaSets) including a plurality of PC parameter sets individual for the uses of the Uu link may be configured in transmission power control information for SL (e.g., SL-PowerControl) in SL-ResourcePool.

In the example illustrated in FIG. 11, PC parameters of the Uu link for UL (dl-Alpha-PSSCH-PSCCH-UL and dl-P0-PSSCH-PSCCH-UL) and PC parameters of the Uu link for DL (dl-Alpha-PSSCH-PSCCH-DL and dl-P0-PSSCH-PSCCH-DL) are configured. Further, for example, PC parameters (dl-Alpha-PSSCH-PSCCH-FL and dl-P0-PSSCH-PSCCH-FL) for flexible link (FL), which is not either UL or DL, may be configured.

Terminal 200 may, for example, select one PC parameter among PC parameters configured in terminal 200 based on the use (e.g., any of DL, UL, or FL) of the Uu link, and calculate transmission power of PSSCH based on the selected PC parameter. This transmission power control allows terminal 200 to reduce the interference giving to the Uu link and appropriately control transmission power of PSSCH.

The exemplary configuration of PC parameters has been described above. Note that the methods for configuring PC parameters, Configuration Example 1 and Configuration Example 2, are merely examples, and PC parameters individual for the uses of the Uu link may be configured by another method.

Next, an exemplary calculation of transmission power in terminal 200 (e.g., transmission power calculator 206) will be described.

Terminal 200, for example, selects a PC parameter to be applied for a time resource of sidelink transmission (e.g., transmission slot timing of PSSCH) from a plurality of PC parameters included in transmission power control information for SL. Terminal 200, for example, calculates the transmission power of PSSCH based on the selected PC parameter and the measured path loss value (e.g., $PL_D$ and $PL_{SL}$).

Hereinafter, a PC parameter to be applied to the transmission timing (transmission slot) of PSSCH will be described.

Selection Example 1

In Selection Example 1, information configuring (or indicating) a PC parameter to be applied in each slot is included in transmission power control information for SL.

Figure 12:
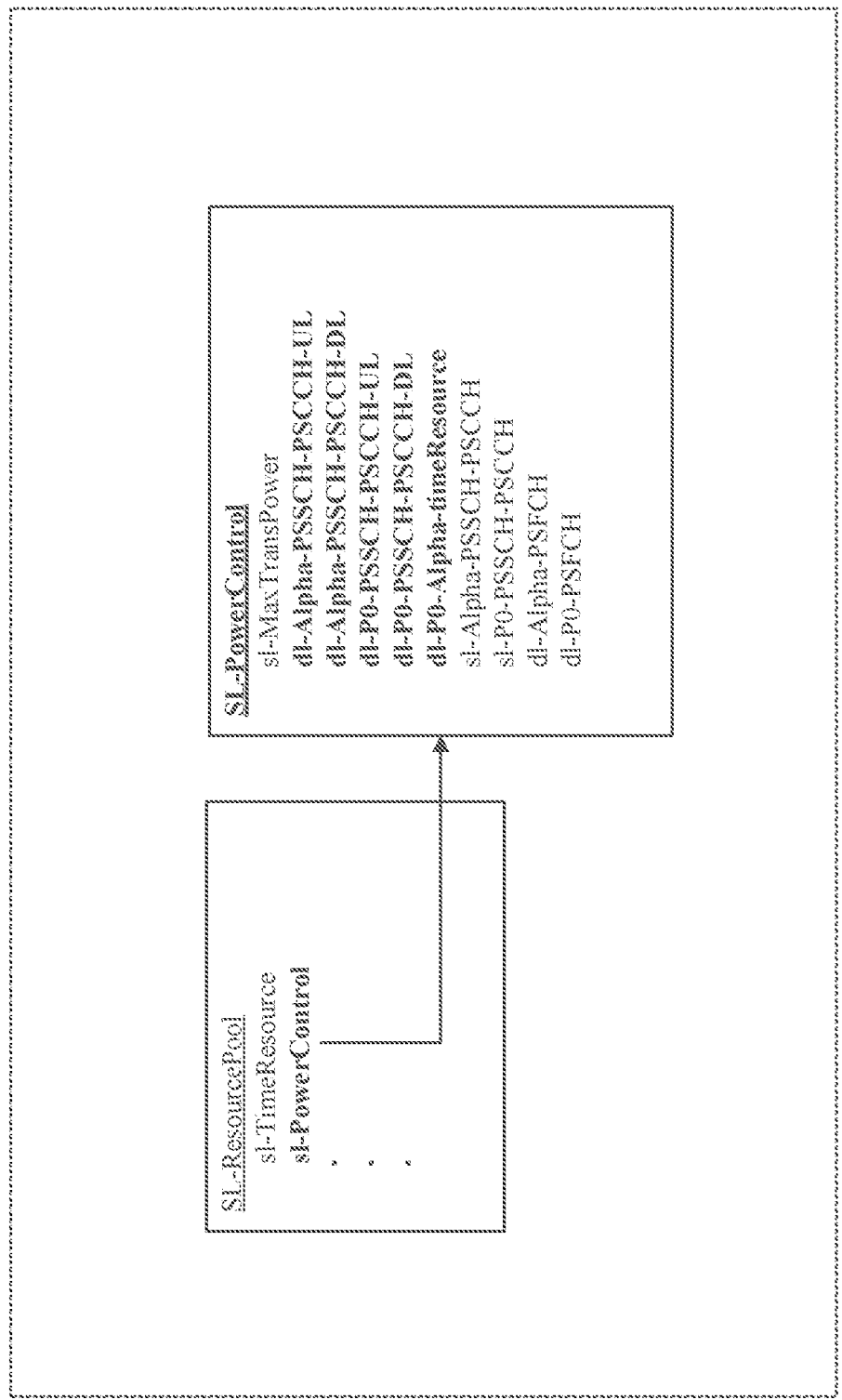
FIG. 12 illustrates an exemplary parameter configuration of transmission power control for the sidelink.

FIG. 12 illustrates exemplary parameter information (e.g., SL-ResourcePool) indicating resource pool configuration of the sidelink in Selection Example 1.

For example, as illustrated in FIG. 12, transmission power control information for SL (SL-PowerControl) may include information configuring a PC parameter for each slot applied periodically in a certain radio frame period (e.g., higher layer parameter: dl-P0-Alpha-timeResource). Note that the radio frame period may be, for example, a period corresponding to 1 System frame number (SFN) or 1 (Direct frame number) DFN.

For example, the slot length configuring a PC parameter for each slot in dl-P0-Alpha-timeResource may be the same slot length as the information (e.g., sl-TimeResource illustrated in FIG. 12) periodically indicating a time resource of a resource pool.

For example, in above-described Configuration Example 1 (e.g., FIG. 10) of PC parameters, information configuring a PC parameter for each slot may indicate an association (or combination) between the slot number and the set ID, as illustrated in FIG. 13. For example, terminal 200 may apply a PC parameter of SetId=0 to slots 0 to 3, apply a PC parameter of SetId=1 to slots 4 to 6, and apply a PC parameter of SetId=2 to slots 7 to 8, based on information for configuring a PC parameter for each slot illustrated in FIG. 13.

Further, for example, in above-described Configuration Example 2 (e.g., FIG. 11) of PC parameters, information configuring a PC parameter for each slot may indicate an association (or combination) between the slot number and the uplink (UL) or the downlink (DL), as illustrated in FIG. 14. For example, terminal 200 may apply a PC parameter for DL to slots 0 to 4, and apply a PC parameter for UL to slots 5 to 9, based on information for configuring a PC parameter for each slot illustrated in FIG. 14.

Note that when the PC parameter for the flexible link (FL) is configured, the information configuring a PC parameter for each slot may include the configuration relating to the flexible link in FIG. 14.

As described above, terminal 200, for example, receives transmission power control information for SL (e.g., higher layer signaling) for configuring a PC parameter applied to the slot of the sidelink transmission, and select any one of the plurality of PC parameters based on the received transmission power control information for SL.

According to Selection Example 1, a PC parameter to be applied in terminal 200 is semi-statically configured based on the use of the Uu link in base station 100, and thus terminal 200 can easily select a PC parameter to be applied in a slot performing PSSCH transmission.

Selection Example 2

In Selection Example 2, terminal 200 selects a PC parameter to be applied to each slot based on the application pattern (e.g., referred to as a DL-UL pattern or an allocation pattern of a time resource) of the uplink and the downlink per a symbol unit applied in the Uu link. For example, terminal 200 may select a PC parameter to be applied to each slot from a plurality of PC parameters included in transmission power control information for SL in accordance with a predetermined rule based on the DL-UL pattern.

Terminal 200 can, for example, identify the DL-UL pattern that base station 100 applies to the Uu link. For example, the DL-UL pattern that base station 100 applies to the Uu link may be configured to terminal 200 by an RRC layer. For example, the DL-UL pattern may be configured by the DL-UL pattern (e.g., also referred to as a sl-TDD-Configuration) included in RRC information of a resource pool.

Figure 15:
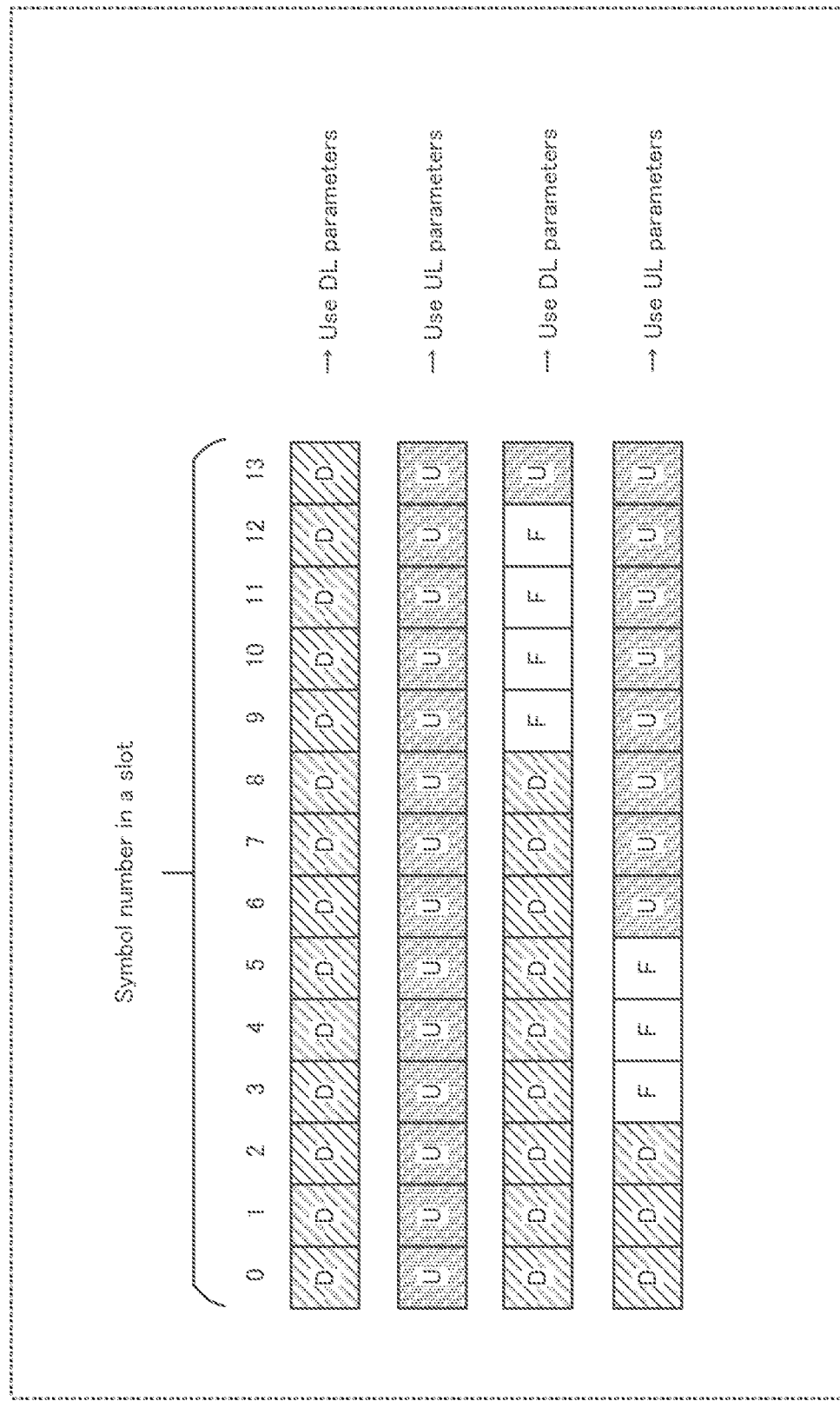
FIG. 15 illustrates an exemplary selection method of a PC parameter.

FIG. 15 illustrates an exemplary DL-UL pattern. As illustrated in FIG. 15, the DL-UL pattern may include time resources (e.g., symbol unit) corresponding to the respective UL, DL, and FL links that base station 100 applies in a predetermine slot length (e.g., 14 symbol). Note that the DL-UL patterns illustrated in FIG. 15 are merely examples, and the number of symbols and the uses and types of the links corresponding to the respective symbols are not limited thereto.

Terminal 200 may, for example, select a PC parameter corresponding to a larger number of symbols among the symbols corresponding to DL, UL, and FL (e.g., also referred to as DL symbol, UL symbol, and FL symbol) in the DL-UL pattern illustrated in FIG. 15.

For example, as illustrated in FIG. 15, when the number of DL symbols is larger than the number of UL symbols, terminal 200 may apply a PC parameter corresponding to DL (e.g., also referred to as a DL parameter) to the slot among the plurality of PC parameters. Similarly, as illustrated in FIG. 15, when the number of UL symbols is larger than the number of DL symbols, terminal 200 may apply a PC parameter corresponding to UL (e.g., also referred to as an UL parameter) to the slot among the plurality of PC parameters.

Note that, in FIG. 15, an example has been described in which the selection of PC parameter is not based on a FL symbol, but the PC parameter may be selected based on a FL symbol. For example, when the number of FL symbols is larger than the numbers of symbols corresponding to DL and UL in a certain slot, terminal 200 may apply a PC parameter corresponding to FL (e.g., also referred to as a FL parameter) to the slot among the plurality of PC parameters.

Further, for example, when there are a plurality of link types having the same number of symbols in the DL-UL pattern, terminal 200 may select a PC parameter corresponding to any one of the plurality of link types.

Further, the FL symbol is, for example, a symbol that can be dynamically used for (or changed to) a UL symbol or a DL symbol by PDCCH (e.g., SFI: Slot-Format-Indicator) in accordance with a traffic state of terminals that base station 100 accommodates. Terminal 200 can, for example, identify the dynamic change of FL symbol (e.g., either DL symbol or UL symbol) by receiving PDCCH (e.g., SFI).

Figure 16:
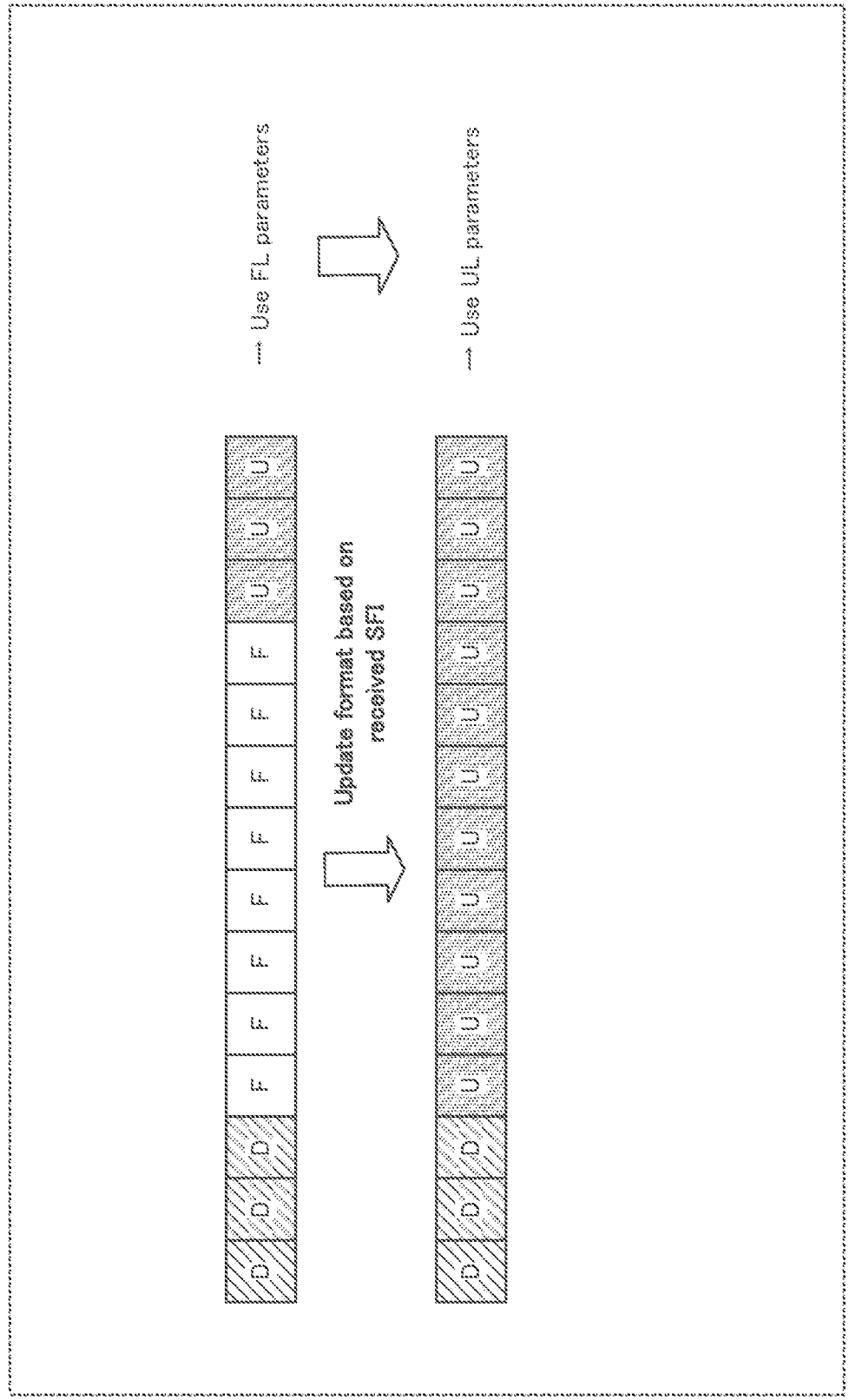
FIG. 16 illustrates another exemplary selection method of a PC parameter.

Then, for example, as illustrated in FIG. 16, terminal 200 may select a PC parameter based on the DL-UL pattern after updating a FL symbol (in other words, after changing FL symbol to either DL or UL). For example, terminal 200 may select a PC parameter corresponding to the larger number of symbols among the DL symbols and the UL symbols in the changed DL-UL pattern.

As described above, terminal 200 selects any one of the plurality of PC parameters based on the information relating to the DL-UL pattern in the slot in the Uu link, for example.

According to Selection Example 2, terminal 200 can dynamically (or autonomously) select a PC parameter to be applied in a PSSCH transmission slot based on the use of the Uu link in base station 100.

Note that, in a case where terminal 200 cannot identify the DL-UL pattern to be applied in the Uu link by base station 100, such as a case where terminal 200 is outside the coverage of base station 100, terminal 200 may select a PC parameter based on the information indicating a PC parameter to be applied to each slot included in transmission power control information for SL, as described in Selection Example 1, for example.

The selection of PC parameter has been described above.

As described above, in the present embodiment, base station 100 configures information relating to the power control method corresponding to the use of the Uu link (in the present embodiment, a plurality of PC parameters individual for the uses of the Uu link) to terminal 200. Further, terminal 200 controls transmission power of the sidelink based on the information relating to the power control method corresponding to the use of the Uu link (in the present embodiment, a PC parameter), and performs sidelink transmission in accordance with the control of transmission power.

Thus, even when a PC parameter is semi-statically configured to terminal 200 by an RRC layer, terminal 200 can appropriately configure transmission power of PSSCH in accordance with the link type u the Uu link; therefore, the giving interference to base station 100 caused by the transmission of PSSCH can be reduced and the throughput by the sidelink can be enhanced.

Therefore, according to the present embodiment, it is possible to enhance the efficiency of the transmission power control of the sidelink. For example, controlling the transmission power of sidelink communication based on the use of the Uu link can enhance the efficiency of transmission power control of the sidelink, and thus can enhance the throughput of data transmission by the sidelink.

Note that, for example, in NR V2X of Rel-16, terminal 200 can perform sidelink transmission when the UL symbol in the slot in which PSSCH is transmitted is equal to or larger than threshold X. In the present embodiment, the definition of the number of UL symbols in a slot may be changed. For example, application of X=0 may be supported. In other words, sidelink transmissions may be allowed regardless of the number of UL symbols in the slot in which PSSCH is transmitted. Alternatively, for example, the sidelink transmission may be allowed when the sum of UL symbols and FL symbols in the slot in which PSSCH is transmitted is equal to or larger than threshold X.

Embodiment 2

[Overview of Communication System]

A communication system according to the embodiment of the present disclosure may include, for example, base station 300 (e.g., gNB or eNB) and terminal 400 (e.g., V2X terminal). The number of terminals 400 may be equal to or larger than 1, but is equal to or larger than 2 when focusing on sidelink communication.

In the present embodiment, a method will be described in which the resource allocation method for sidelink communication (e.g., a mode in which base station 300 determines the resource used by terminal 200 in the sidelink) is Mode 1.

In Mode 1, base station 300 transmits control information (e.g., PDCCH or DCI) including sidelink transmission resource to terminal 400 (e.g., V2X terminal), and terminal 400 receives the control information. In the present embodiment, the control information transmitted from base station 300 to terminal 400 may include information indicating a PC parameter to be applied to a time resource (e.g., a slot) of sidelink transmission.

Exemplary Configuration of Base Station

Figure 17:
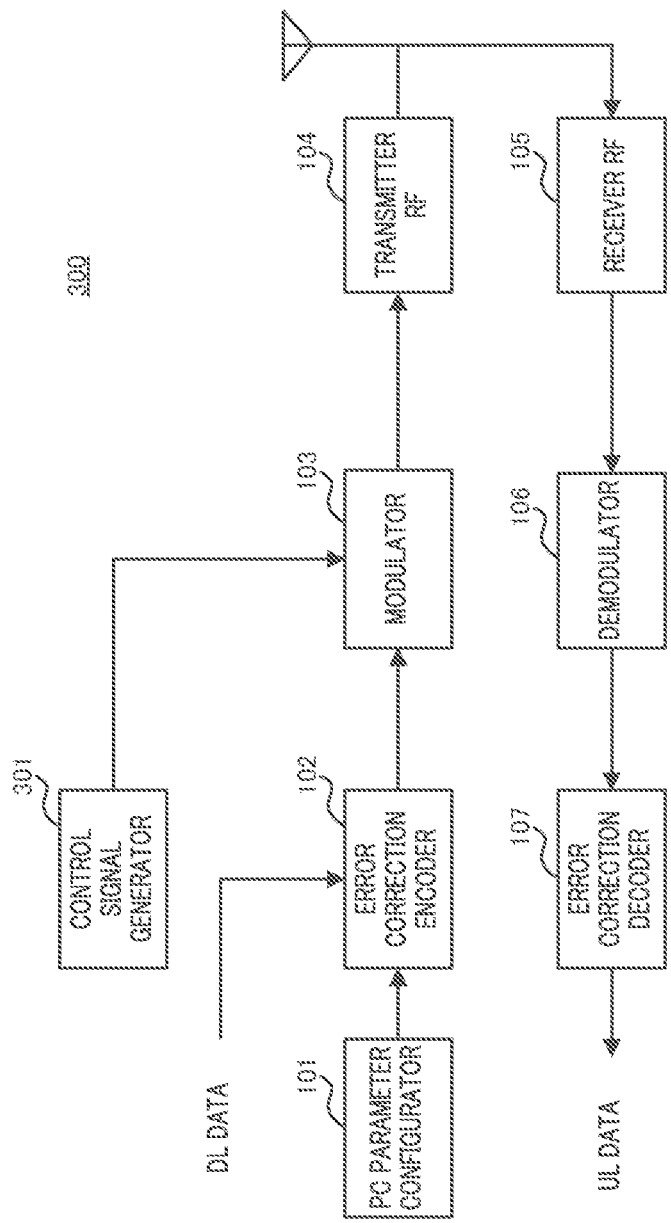
FIG. 17 is a block diagram illustrating an exemplary configuration of the base station.

FIG. 17 is a block diagram illustrating an exemplary configuration of base station 300 according to the present embodiment. Note that, in FIG. 17, the same components as those in Embodiment 1 (FIG. 7) are denoted by the same reference numerals. Base station 300 illustrated in FIG. 17 is different from base station 100 illustrated in FIG. 7 in that control signal generator 301 is added.

Control signal generator 301, for example, generates control information (e.g., control information to be included in PDCCH) transmitted from base station 300 to terminal 400. The control information may include, for example, Sidelink control information (SCI), which is control information for the sidelink transmission. Further, in addition to SCI, the control information may include information indicating a PC parameter for PSSCH. The information indicating a PC parameter for PSSCH may be, for example, information indicating a PC parameter to be applied in terminal 400 among a plurality of PC parameters configured in terminal 400 by an RRC layer.

Note that the transmission timings (e.g., transmission slot timing) of an output signal from error correction encoder 102 (e.g., including configuration information of an RRC layer) and an output signal from control signal generator 301 are the same as or different from each other.

Another processing different from the above-described processing in base station 300 may be the same as Embodiment 1, for example.

Exemplary Configuration of Terminal

Figure 18:
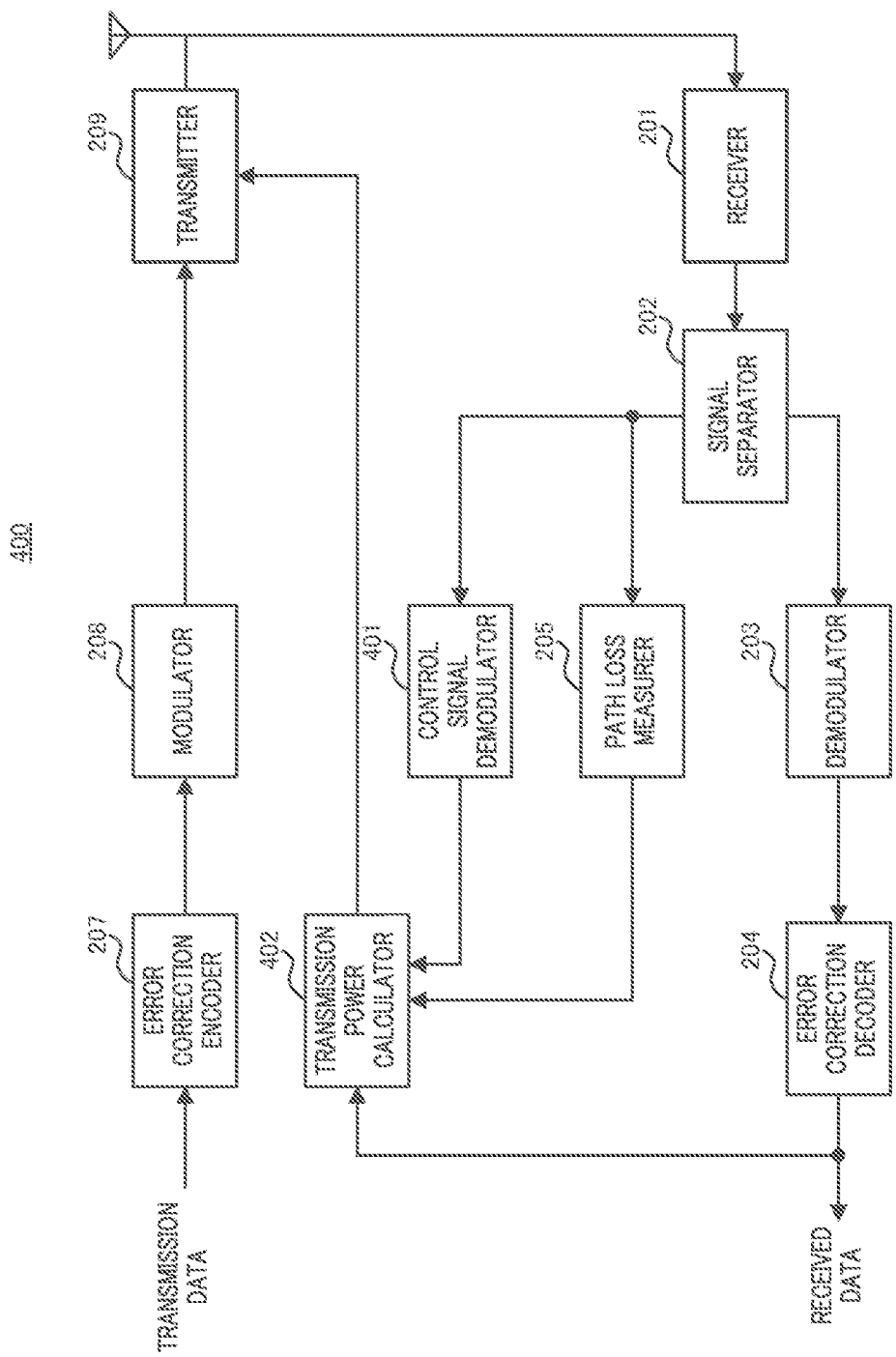
FIG. 18 is a block diagram illustrating an exemplary configuration of the terminal.

FIG. 18 is a block diagram illustrating an exemplary configuration of base station 400 according to the present embodiment. Note that, in FIG. 18, the same components as those in Embodiment 1 (FIG. 8) are denoted by the same reference numerals. Terminal 400 illustrated in FIG. 18 is different from terminal 200 illustrated in FIG. 8 in that control signal demodulator 401 is added and the operation of transmission power calculator 402 is different.

Control signal demodulator 401 demodulates PDCCH from base station 300 and receives the control signal. Control signal demodulator 401, for example, selects a PC parameter to be applied in sidelink transmission based on the control signal, and outputs information on the selected PC parameter to transmission power calculator 402.

Transmission power calculator 402 calculates transmission power of sidelink transmission based on the information on the PC parameter input from control signal demodulator 401.

Another processing in terminal 400 different from the above processing may be the same as in Embodiment 2.

Exemplary Operation of Base Station 300 and Terminal 400

Base station 300 may, for example include information on the association of a PC parameter with the indication information of the PC parameter notified by the control signal (e.g., PDCCH or DCI) in transmission power control information for SL configured to terminal 200 by a higher layer. For example, when the indication information of the PC parameter is one bit (when the value is 0 or 1), the PC parameter when the Uu link is for UL may be associated with value 0 of the indication information, and the PC parameter when the Uu link is for DL may be associated with value 1 of the indication information. Note that the number of bits of the indication information and the association with the PC parameter are not limited to the above-described example.

Terminal 400 may select a PC parameter indicated by indication information of the PC parameter included in the control signal (e.g., PDCCH) notified from base station 300 among a plurality of configured PC parameters, for example. Then, terminal 400 may, for example, calculate the transmission power of the sidelink based on the selected PC parameter and the measured path loss (e.g., $PL_D$ and $PL_{SL}$).

As described above, base station 300 transmits downlink control information (e.g., PDCCH or DCI) indicating a PC parameter applied to the slot of the sidelink transmission among the plurality of PC parameters configured in terminal 400. Further, terminal 400 receives downlink control information (e.g., PDCCH or DCI) indicating the PC parameter to be applied to the slot of sidelink transmission among the plurality of PC parameters configured in terminal 400, and select any one of the plurality of PC parameters based on the received transmission power control information for SL.

This allows base station 300 to dynamically indicate a PC parameter to be applied to PSSCH by control signaling (PDCCH or dynamic signaling) depending on the use of the Uu link. Further, terminal 400 receives indication relating to a PC parameter to be applied in PSSCH by PDCCH, and thus can dynamically determine transmission power of the sidelink depending on the use of the Uu link.

Therefore, according to Embodiment 2, it is possible to enhance the efficiency of the transmission power control of the sidelink. For example, the transmission power control of sidelink communication based on the use of the Uu link can enhance the efficiency of transmission power control of the sidelink, and thus can enhance the throughput of data transmission by the sidelink.

The embodiments of the present disclosure have been described above.

In each of the above-described embodiments, a method has been described in which the terminal (e.g., terminal 200 or terminal 400; hereinafter, the same applied) selects a PC parameter based on the use of the Uu link by the base station (e.g., base station 100 or base station 300; hereinafter, the same applied), but the selection criterion of PC parameter is not limited to the use of the Uu link. The plurality of PC parameters for sidelink transmission may be configured as follows, for example.

Example 1

For example, when both configurations of Mode 1 and Mode 2 for one terminal are supported as a resource allocation method of the sidelink communication, the terminal may select (or switch) a PC parameter to be applied to the sidelink transmission based on a resource allocation method (e.g., either Mode 1 or Mode 2) applied when performing PSSCH transmission. In other words, PC parameters may be individually configured for resource allocation methods (e.g., Mode 1 and Mode 2) applied to PSSCH transmission.

For example, in transmission power control information for SL configured by an RRC layer from the base station to the terminal, PC parameters for Mode 1 (e.g., $P_{O,D,Mode1}$ and $\alpha_{D,Mode1}$) and PC parameters for Mode 2 (e.g., $P_{O,D,Mode2}$ and $\alpha_{D,Mode2}$) may be configured. When transmitting PSSCH in Mode 1 in which the transmission resource is determined by the indication from the base station, the terminal may, for example, calculate the transmission power $P_{PSSCH,D}(i)$ based on Equation 5. Further, when transmitting PSSCH in Mode 2 in which the terminal determines the transmission resource, the terminal may, for example, calculate the transmission power $P_{PSSCH,D}(i)$ based on Equation 6.

$$P_{PSSCH,D}(i) = P_{O,D,Mode1} + 10\log_{10}(2^{\mu} \cdot M_{RB}^{PSSCH}(i)) + \alpha_{D,Mode1} \cdot PL_D \quad \text{(Equation 5)}$$

$$P_{PSSCH,D}(i) = P_{O,D,Mode2} + 10\log_{10}(2^{\mu} \cdot M_{RB}^{PSSCH}(i)) + \alpha_{D,Mode2} \cdot PL_D \quad \text{(Equation 6)}$$

Thus, the base station and the terminal can control transmission power of the sidelink transmission and the interference level acceptable to the base station depending on the resource allocation mode of the sidelink transmission.

Example 2

For example, in the sidelink transmission, the "Periodic transmission" in which the terminal periodically transmits a signal by the notification of one control signal and the "Aperiodic transmission" in which the terminal transmits one signal by the notification of one control signal are considered.

For example, the Aperiodic transmission tends to be more likely to transmit information that requires low latency or high reliability compared to the Periodic transmission.

Thus, for example, PC parameters different between the Periodic transmission and the Aperiodic transmission may be configured. The terminal may, for example, select (or switch) a PC parameter to be applied to the sidelink transmission based on either the Periodic transmission or the Aperiodic transmission.

Thus, the base station and the terminal can control transmission power of the sidelink transmission and the interference level acceptable to the base station depending on the transmission frequency of the sidelink transmission.

Example 3

For example, when the resource allocation mode is Mode 1, a method (also referred to as Configured grant scheduling) in which the base station semi-statically schedules a periodic radio resource to the terminal by the notification of an RRC layer and a method (also referred to as Dynamic grant scheduling) in which the base station dynamically schedules one sidelink transmission to the terminal by using a control signal (PDCCH) are considered.

Transmission by Dynamic grant scheduling (Dynamic grant transmission) tends to be more likely to transmit information that requires low latency or high reliability than transmission by Configured grant scheduling (Configured grant transmission).

Thus, for example, PC parameters different between the Configured grant transmission and the Dynamic grant transmission may be configured. The terminal may, for example, select (or switch) a PC parameter to be applied to the sidelink transmission based on either the Configured grant transmission or the Dynamic grant transmission.

Thus, the base station and the terminal can control transmission power of the sidelink transmission and the interference level acceptable to the base station depending on the scheduling method of the sidelink transmission by the base station.

Example 4

For example, the required condition of low latency or high reliability of transmission data may vary depending on the cast type such as unicast, groupcast, or broadcast.

Then, PC parameters individual for cast types such as unicast, groupcast, and broadcast may be configured. The terminal may, for example, select (or switch) a PC parameter to be applied to the sidelink transmission based on the cast type.

Thus, the base station and the terminal can control transmission power of the sidelink transmission and the interference level acceptable to the base station depending on the cast type by which the sidelink transmission is performed.

Example 5

For example, 1st-stage SCI that the terminal transmits by PSSCH includes information (Priority field) on the priority of the associated data.

Therefore, for example, the base station may configure different PC parameters based on the priority information. For example, the terminal may select (or switch) a PC parameter to be applied to PSSCH based on the priority information configured in 1st-stage SCI.

Thus, the base station and the terminal can control transmission power of the sidelink transmission and the interference level acceptable to the base station depending on the priority of data for the sidelink transmission.

Example 6

For example, as illustrated in FIG. 1, there are a slot (e.g., (b) in FIG. 1) including PSFCH, which is feedback request information from the reception terminal, and a slot including no PSFCH (e.g., (a) in FIG. 1) in the sidelink transmission.

Because HARQ is not applied to a slot including no PSFCH, high reliability is required for the slot including no PSFCH compared to the slot including PSFCH.

Thus, for example, different PC parameters may be configured based on the presence or absence of PSFCH. The terminal may, for example, select (or switch) a PC parameter to be applied to the sidelink transmission based on whether PSFCH is mapped in a slot.

Thus, the base station and the terminal can control transmission power of the sidelink transmission and the interference level acceptable to the base station depending on the presence or absence of feedback request information of the sidelink transmission.

The exemplary configurations of PC parameters have been described above. Note that the PC parameter may be configured in accordance with at least two examples among Examples 1 to 6 described above.

Further, in the above-described embodiments, the examples have been described in which PC parameters of the plurality of sets are the PC parameters to be applied for transmission power control based on the path loss of DL (e.g., $P_{0,D}$ and $\alpha_D$ of Equation 2), but the present disclosure is not limited thereto. For example, the PC parameters configured to be a plurality of sets may be PC parameters to be applied to transmission power control based on the path loss of the sidelink (e.g., $P_{0,SL}$ and $\alpha_{SL}$ in Equation 3). Accordingly, the terminal can control the transmission power (e.g., $P_{PSSCH,SL}(i)$) based on the path loss of the sidelink in accordance with the use of the Uu link by the base station, and thus can appropriately control the transmission power of PSSCH based on the transmission data volume or the MCS of the sidelink.

Further, in the above-described embodiment, the case in which a PC parameter is changed depending on the use of the Uu link has been described, but the present disclosure is not limited thereto, and for example, the terminal may change the transmission power control equation to be used for transmission power control of the sidelink depending on the use of the Uu link. For example, a transmission power control equation that depends on the use (or operation or type) of the Uu link may be applied. In other words, transmission power control equations individual for different uses of the Uu link may be applied. For example, when the Uu link is used for DL, the terminal may calculate transmission power in accordance with the transmission power control equation of PSSCH as described in Equation 7, and when the Uu link is used for UL, the terminal may calculate transmission power in accordance with the transmission power control equation of PSSCH as described in Equation 8.

$$P_{PSSCH}(i) = \min(P_{CMAX}, P_{CBR}, P_{PSSCH,SL}(i)) \quad \text{(Equation 7)}$$

$$P_{PSSCH}(i) = \min(P_{CMAX}, P_{CBR}, P_{PSSCH,D}(i)) \quad \text{(Equation 8)}$$

For example, the transmission power equation described in Equation 7 may be understood to be equivalent to the case where the transmission power (e.g., $P_{PSSCH,SL}(i)$) based on the path loss of the sidelink is configured to be valid and the transmission power (e.g., $P_{PSSCH,D}(i)$) based on the path loss of the downlink is configured to be invalid in Equation 1. On the other hands, for example, the transmission power equation described in Equation 8 may be understood to be equivalent to the case where the transmission power (e.g., $P_{PSSCH,SL}(i)$) based on the path loss of the sidelink is configured to be invalid and the transmission power (e.g., $P_{PSSCH,D}(i)$) based on the path loss of the downlink is configured to be valid in Equation 1.

Even when the transmission power control equations to be applied in the terminal are configured individually for different uses of the Uu link, the same working effect as the above-described embodiments can be obtained. Note that, for example, the information on the transmission power control equation may be explicitly or implicitly notified (or configured) from the base station to the terminal by higher layer signaling or PDCCH (or DCI), or may be pre-configured to the terminal.

Further, in the above-described embodiments, the transmission power control of PSSCH has been described, but the target of the transmission power control in the sidelink is not limited to PSSCH, and may be another channel or signal.

(Control Signal)

In an exemplary embodiment of the present disclosure, the downlink control signal (or downlink control information) may be, for example, a signal (or information) transmitted at a Physical Downlink Control Channel (PDCCH) in the physical layer, or a signal (or information) transmitted at Medium Access Control (MAC) or Radio Resource Control (RRC) in the higher layer. In addition, the signal (or information) is not limited to a case of being indicated by the downlink control signal and may be specified in advance by the specifications (or standards) or may be configured in advance in the base station and the terminal.

In an exemplary embodiment of the present disclosure, the uplink control signal (or uplink control information) may be, for example, a signal (or information) transmitted in a PDCCH in the physical layer, or a signal (or information) transmitted in MAC or RRC in the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may be adopted instead of a base station. Further, instead of a base station, a relay apparatus may be adopted for relaying the communication between a higher node and a terminal.

(Uplink/Downlink/Sidelink)

An exemplary embodiment of the present disclosure may be applied to, for example, any of the uplink, downlink, and sidelink. In one example, an exemplary embodiment of the present disclosure may be applied to a Physical Uplink Shared Channel (PUSCH), a Physical Uplink Control Channel (PUCCH), and a Physical Random Access Channel (PRACH) in uplink, a Physical Downlink Shared Channel (PDSCH), a PDCCH, and a Physical Broadcast Channel (PBCH) in downlink, or a Physical Sidelink Shared Channel (PSSCH), a Physical Sidelink Control Channel (PSCCH), and a Physical Sidelink Broadcast Channel (PSBCH) in sidelink.

The PDCCH, the PDSCH, the PUSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and the PSBCH are examples of a broadcast channel, and the PRACH is an example of a random access channel.

(Data Channel/Control Channel)

An exemplary embodiment of the present disclosure may be applied to, for example, any of a data channel and a control channel. In one example, a channel in an exemplary embodiment of the present disclosure may be replaced with any of a PDSCH, a PUSCH, and a PSSCH for the data channel, or a PDCCH, a PUCCH, a PBCH, a PSCCH, and a PSBCH for the control channel.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of: a Demodulation Reference Signal (DMRS); a Channel State Information-Reference Signal (CSI-RS); a Tracking Reference Signal (TRS); a Phase Tracking Reference Signal (PTRS); a Cell-specific Reference Signal (CRS); or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above and may be other numbers of symbols.

(Frequency Band)

An exemplary embodiment of the present disclosure may be applied to either of a licensed band or an unlicensed band.

(Communication)

An exemplary embodiment of the present disclosure may be applied to any of the communication between a base station and a terminal, the communication between terminals (Sidelink communication, Uu link communication), and the communication for Vehicle to Everything (V2X). In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either of terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network.

(Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 19:
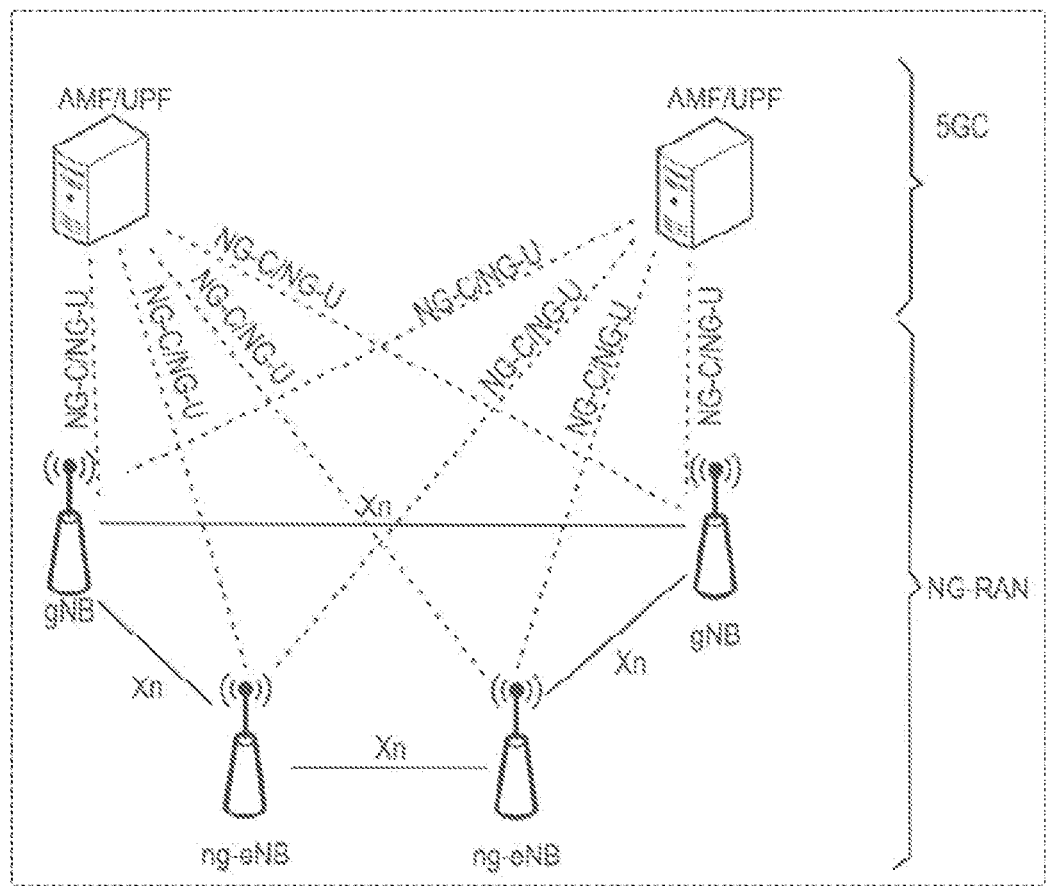
FIG. 19 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 19 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km2 in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz, . . . are being considered at the moment. The symbol duration Tu and the subcarrier spacing $\Delta f$ are directly related through the formula $\Delta f = 1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split between NG-RAN and 5GC in 5G NR>

Figure 20:
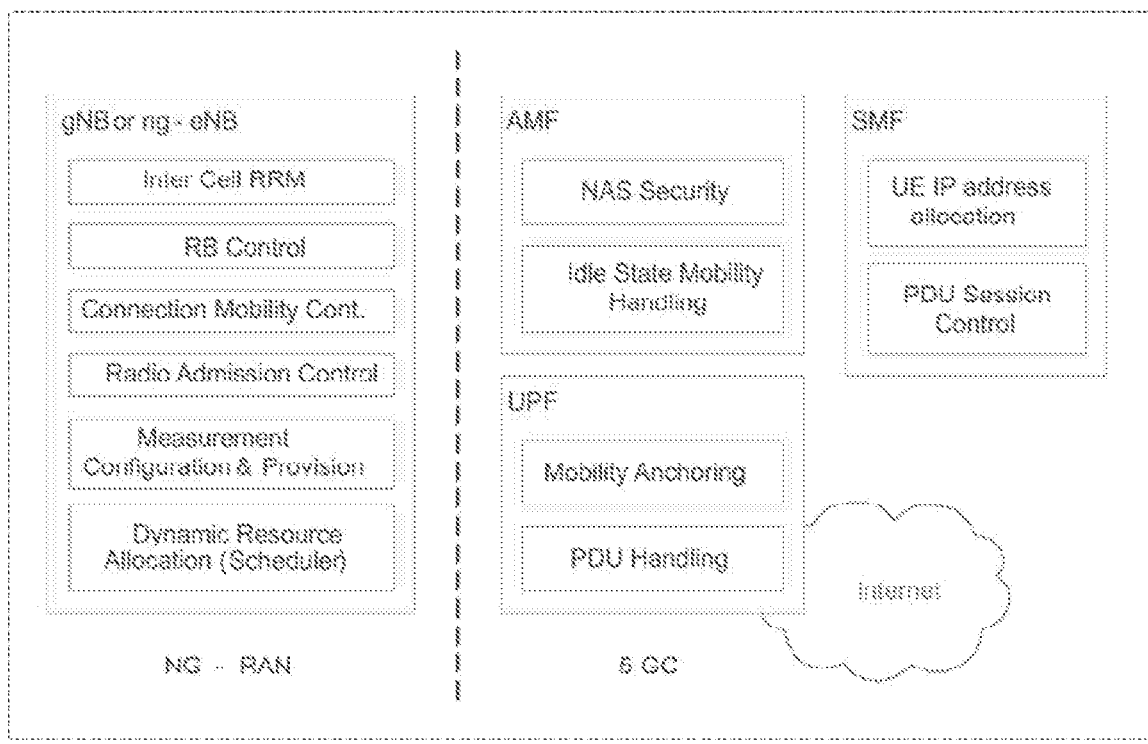
FIG. 20 schematically illustrates a functional split between Next Generation-Radio Access Network (NG-RAN) and 5th Generation Core (5GC)

FIG. 20 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

In addition, the User Plane Function (UPF) hosts the following main functions:
Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping): and
Function of downlink packet buffering and downlink data notification triggering.

Finally, the Session Management Function (SMF) hosts the following main functions:
Session management;
UE IP address allocation and management;
Selection and control of UPF;
Configuration function for traffic steering at the User Plane Function (UPF) to route traffic to a proper destination;
Control part of policy enforcement and QoS; and
Downlink data notification.

RRC Connection Setup and Reconfiguration Procedure>

Figure 21:
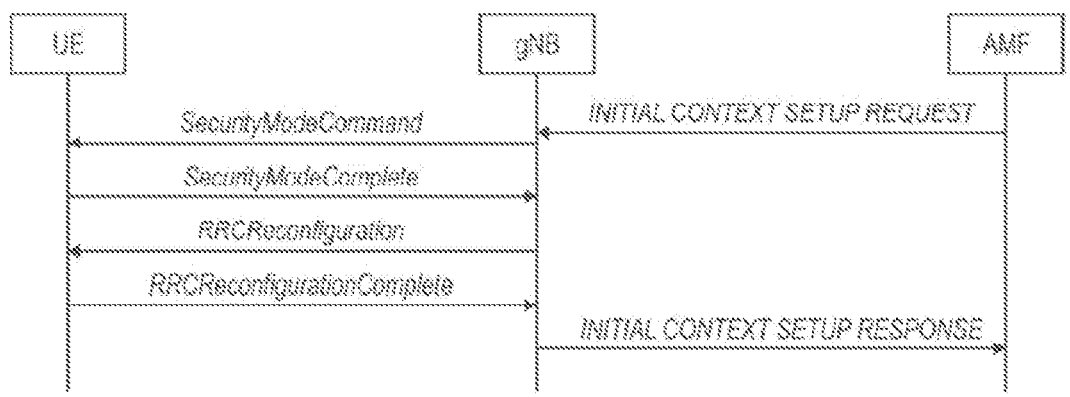
FIG. 21 is a sequence diagram of a Radio Resource Control (RRC) connection setup/reconfiguration procedure.

FIG. 21 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 22:
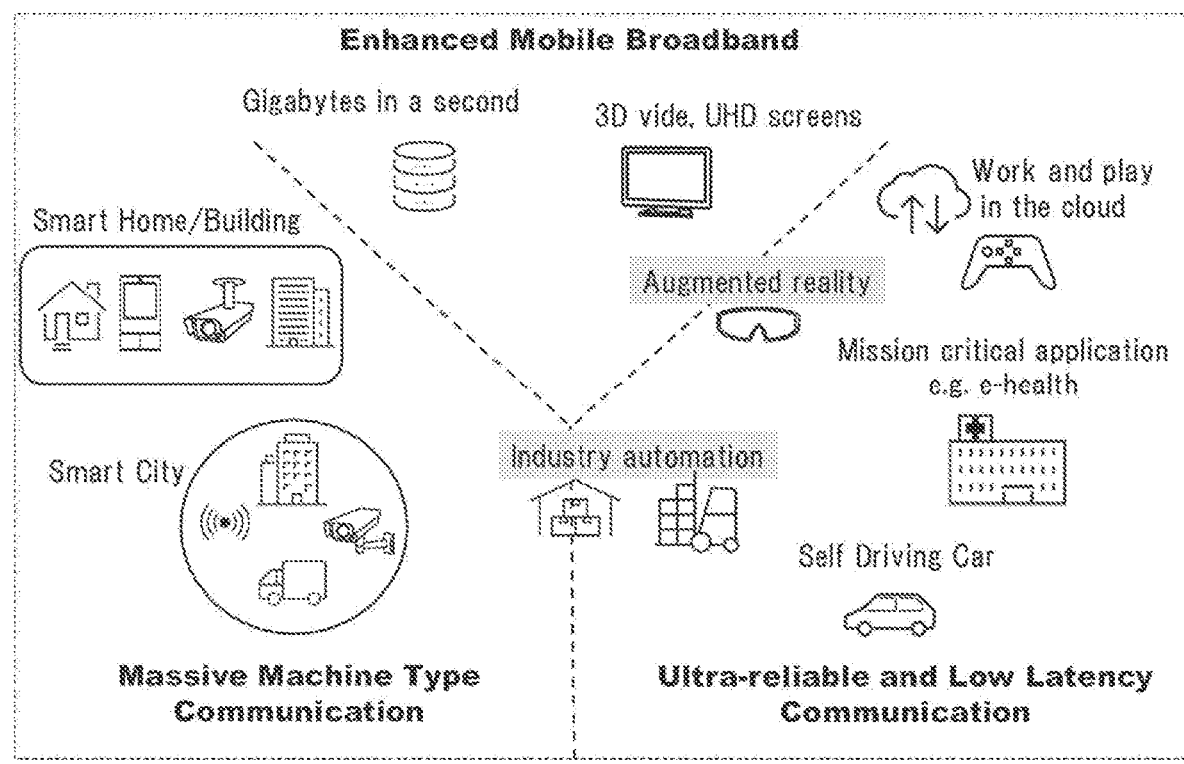
FIG. 22 schematically illustrates usage scenarios of enhanced Mobile BroadBand (eMBB) massive Machine Type Communications (mMTC), and Ultra Reliable and Low Latency Communications (URLLC)

FIG. 22 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 22 illustrates some examples of envisioned usage scenarios for IMT for 2020 and beyond (see e.g., ITU-R M. 2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few µs (where the value can be one or a few µs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 21. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NO-RAN associate UL and DL QoS Flows with DRBs.

Figure 23:
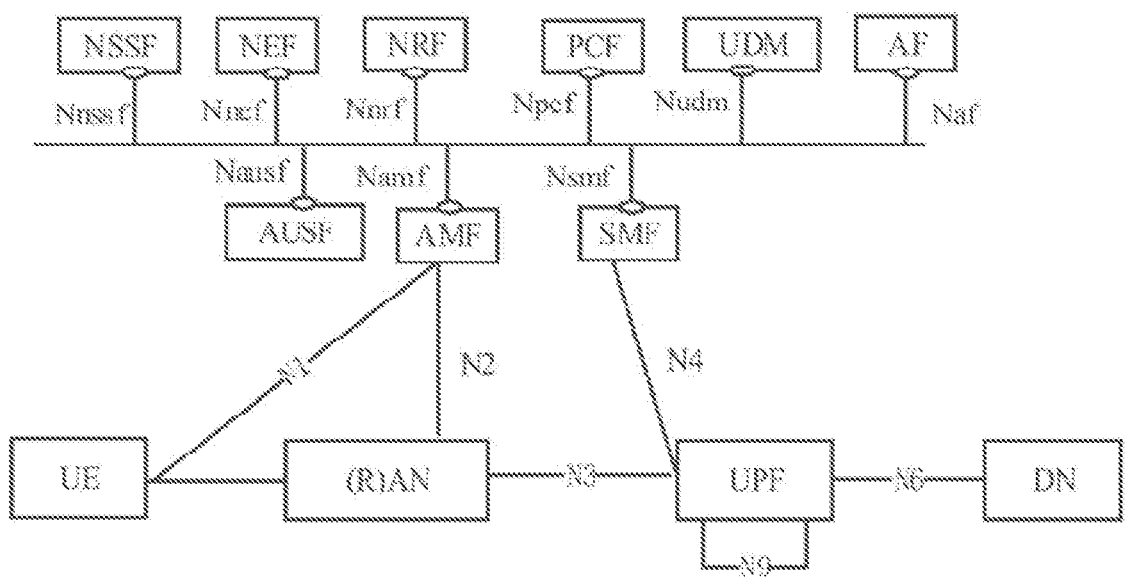
FIG. 23 is a block diagram illustrating an exemplary 5G system architecture for a non-roaming scenario.

FIG. 23 illustrates a 5G NR non-roaming reference architecture (see TS 23.501 v16.1.0, section 4.23). An Application Function (AF) (e.g., an external application server hosting 5G services, exemplarily described in FIG. 22) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 23 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to the embodiment of the present disclosure includes: control circuitry, which, in operation, performs control of transmission power of a sidelink based on information on a power control method that depends on a use of a communication link in a base station; and transmission circuitry, which, in operation, performs sidelink transmission in accordance with the control of the transmission power.

In the embodiment of the present disclosure, the information includes a plurality of power control parameters individual for a plurality of the uses different from each other.

In the embodiment of the present disclosure, the plurality of power control parameters are parameters on transmission power based on a path loss in the communication link.

In the embodiment of the present disclosure, the plurality of uses of the communication link include a downlink and an uplink, and the plurality of power control parameters include parameters individual for the downlink and the uplink.

In the embodiment of the present disclosure, the plurality of uses of the communication link include a downlink and an uplink, and the plurality of power control parameters include parameters individual for a time resource of the downlink, a time resource of the uplink, and a time resource usable for either the downlink or the uplink.

In the embodiment of the present disclosure, the terminal further includes reception circuitry, which, in operation, receives a higher layer signaling for configuring a power control parameter to be applied to a time resource of the sidelink transmission, and the control circuitry selects any one of the plurality of power control parameters based on the higher layer signaling.

In the embodiment of the present disclosure, the control circuitry selects any one of the plurality of power control parameters based on information on an allocation pattern of a time resource in the communication link.

In the embodiment of the present disclosure, the allocation pattern includes a time resource corresponding to at least one of a downlink, an uplink, and/or a flexible link, and the control circuitry selects, in the allocation pattern, at least one of the plurality of power control parameters which corresponds to a larger number of time resources among time resources corresponding to the downlink, the uplink, and the flexible link.

In the embodiment of the present disclosure, the control circuitry selects at least one of the plurality of power control parameters based on the allocation pattern after a change of the flexible link to either the downlink or the uplink.

In the embodiment of the present disclosure, the terminal further includes reception circuitry, which, in operation, receives downlink control information indicating at least one of the plurality of power control parameters to be applied to a time resource of the sidelink transmission, and the control circuitry selects any one of the plurality of power control parameters based on the downlink control information.

In the embodiment of the present disclosure, the information includes information on a power control equation that depends on the use.

In a communication method according to the embodiment of the present disclosure, the terminal performs control of transmission power of a sidelink based on information on a power control method that depends on a use of a communication link in a base station, and performs sidelink transmission in accordance with the control of the transmission power.

The disclosure of Japanese Patent Application No. 2020-159879, filed on Sep. 24, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST 100, 300 Base station
101 PC Parameter configurator
102, 207 Error Correction encoder
103, 208 Modulator
104, 209 Transmitter
105, 201 Receiver
106, 203 Demodulator
107, 204 Error correction decoder
200, 400 Terminal
202 Signal separator
205 Path loss measurer
206, 402 Transmission power calculator
301 Control signal generator
401 Control signal demodulator

The invention claimed is:

1. A terminal comprising:
control circuitry, which, in operation, performs control of transmission power of an uplink based on information on a power control method that depends on a use of a communication link in a base station, the information being indicated by higher layer signaling; and transmission circuitry, which, in operation, performs uplink transmission in accordance with the control of the transmission power, wherein, the information includes a plurality of power control parameters, each of which includes a combination of a target reception power and a path loss compensation rate, the plurality of power control parameters being individual for a first symbol and a second symbol that is not the first symbol, and one of the plurality of power control parameters is selected based on an assignment pattern of the first symbol and the second symbol.

2. The terminal according to claim 1, wherein a plurality of uses of the communication link include a downlink and an uplink, and the plurality of power control parameters include parameters individual for the downlink and the uplink.

3. The terminal according to claim 1, wherein a plurality of uses of the communication link include a downlink and an uplink, and the first symbol and the second symbol are one of a symbol of the downlink, a symbol of the uplink, and a symbol usable for either the downlink or the uplink, respectively.

4. The terminal according to claim 1, comprising reception circuitry, which, in operation, receives the higher layer signaling for configuring a power control parameter to be applied to a time resource of the uplink transmission, wherein the control circuitry selects one of the plurality of power control parameters based on the higher layer signaling.

5. The terminal according to claim 1, wherein the assignment pattern includes a symbol corresponding to at least one of a downlink, an uplink, and/or a flexible link, and the control circuitry selects, in the assignment pattern, at least one of the plurality of power control parameters which corresponds to a larger number of symbols among symbols corresponding to the downlink, the uplink, and the flexible link.

6. The terminal according to claim 5, wherein the control circuitry selects at least one of the plurality of power control parameters based on the assignment pattern after a change of the flexible link to either the downlink or the uplink.

7. The terminal according to claim 1, comprising reception circuitry, which, in operation, receives downlink control information indicating at least one of the plurality of power control parameters to be applied to a symbol of the uplink transmission, wherein the control circuitry selects any one of the plurality of power control parameters based on the downlink control information.

8. The terminal according to claim 1, wherein the information includes information on a power control equation that depends on the use.

9. A communication method comprising:

performing, by a terminal, control of transmission power of an uplink based on information on a power control method that depends on a use of a communication link in a base station, the information being indicated by higher layer signaling; and performing, by the terminal, uplink transmission in accordance with the control of the transmission power, wherein, the information includes a plurality of power control parameters, each of which includes a combination of a target reception power and a path loss compensation rate, the plurality of power control parameters being individual for a first symbol and a second symbol that is not the first symbol, and one of the plurality of power control parameters is selected based on an assignment pattern of the first symbol and the second symbol.

* * * * *